(12) United States Patent
Kawaguchi et al.

(10) Patent No.: US 11,892,281 B2
(45) Date of Patent: Feb. 6, 2024

(54) OPTICAL MEASUREMENT SYSTEM, OPTICAL MEASUREMENT METHOD, AND NON-TRANSITORY STORAGE MEDIUM HAVING MEASUREMENT PROGRAM STORED THEREON

(71) Applicant: Otsuka Electronics Co., Ltd., Osaka (JP)

(72) Inventors: Shiro Kawaguchi, Hirakata (JP); Kazuya Nakajima, Hirakata (JP); Hayato Takizawa, Hirakata (JP); Goro Maeda, Hirakata (JP)

(73) Assignee: Otsuka Electronics Co., Ltd., Osaka (JP)

( * ) Notice: Subject to any disclaimer, the term of this patent is extended or adjusted under 35 U.S.C. 154(b) by 0 days.

(21) Appl. No.: 17/655,899

(22) Filed: Mar. 22, 2022

(65) Prior Publication Data

US 2022/0316862 A1 Oct. 6, 2022

(30) Foreign Application Priority Data

Mar. 23, 2021 (JP) ................................. 2021-048379

(51) Int. Cl.
*G01B 11/06* (2006.01)
*G01J 3/02* (2006.01)
(Continued)

(52) U.S. Cl.
CPC ........ *G01B 11/0625* (2013.01); *G01B 5/0014* (2013.01); *G01B 9/0207* (2013.01);
(Continued)

(58) Field of Classification Search
CPC .................. G01B 11/0625; G01B 5/0014; G01B 9/0207; G01B 11/06; G01B 11/0675;
(Continued)

(56) References Cited

U.S. PATENT DOCUMENTS 5,386,295 A * 1/1995 Switalski ................. G01J 3/44
356/417
2003/0147081 A1 8/2003 Inamoto et al.
(Continued)

FOREIGN PATENT DOCUMENTS

EP 0 174 722 A2 3/1986
EP 0 296 956 A2 12/1988
(Continued)

OTHER PUBLICATIONS

Search Report mailed by The Intellectual Property Office of the United Kingdom dated Jul. 15, 2022, which corresponds to U.K. Patent Application No. GB2203841.8, and is related to U.S. Appl. No. 17/655,899.

*Primary Examiner* — Michelle M Iacoletti
*Assistant Examiner* — Noah J. Haney
(74) *Attorney, Agent, or Firm* — Studebaker & Brackett PC

(57) ABSTRACT

An optical measurement system includes a light source, a spectroscopic detector, a reference sample, a switching mechanism that switches between a first optical path through which a sample to be measured is irradiated with light from the light source and light produced at the sample is guided to the spectroscopic detector and a second optical path through which the reference sample is irradiated with light from the light source and light produced at the reference sample is guided to the spectroscopic detector, and a processing unit that calculates, by performing correction processing based on change between a first detection result at first time and a second detection result at second time, a measurement value of the sample from a third detection result provided from the spectroscopic detector as a result of irradiation of the sample with light from the light source at third time temporally proximate to the second time.

20 Claims, 19 Drawing Sheets

(51) Int. Cl.
  *G01J 3/10* (2006.01)
  *G01B 5/00* (2006.01)
  *G01N 21/27* (2006.01)
  *G01B 9/02055* (2022.01)
  *G01J 3/28* (2006.01)
  *G01N 21/25* (2006.01)
  *G01B 21/04* (2006.01)

(52) U.S. Cl.
  CPC .......... *G01B 11/06* (2013.01); *G01B 11/0675* (2013.01); *G01B 21/045* (2013.01); *G01J 3/02* (2013.01); *G01J 3/027* (2013.01); *G01J 3/0232* (2013.01); *G01J 3/0286* (2013.01); *G01J 3/0291* (2013.01); *G01J 3/0297* (2013.01); *G01J 3/10* (2013.01); *G01J 3/28* (2013.01); *G01N 21/25* (2013.01); *G01N 21/274* (2013.01); *G01N 21/276* (2013.01); *G01J 2003/2836* (2013.01)

(58) Field of Classification Search
  CPC ........ G01B 21/045; G01J 3/02; G01J 3/0232; G01J 3/027; G01J 3/0286; G01J 3/0291; G01J 3/0297; G01J 3/10; G01J 3/28; G01J 2003/2836; G01N 21/25; G01N 21/274; G01N 21/276
  USPC .......................................................... 356/630
  See application file for complete search history.

(56) References Cited

U.S. PATENT DOCUMENTS

| | | | |
|---|---|---|---|
| 2008/0203314 A1* | 8/2008 | Harrison | G01J 3/0286 250/372 |
| 2009/0112475 A1 | 4/2009 | Christy et al. | |
| 2011/0128542 A1 | 6/2011 | Sekine | |
| 2018/0231457 A1* | 8/2018 | Chen | G01N 21/274 |

FOREIGN PATENT DOCUMENTS

| | | | | |
|---|---|---|---|---|
| JP | H07159130 A | * | 6/1995 | |
| JP | 2001165628 A | * | 6/2001 | |
| JP | 2001-289627 A | | 10/2001 | |
| JP | 2002-39955 A | | 2/2002 | |
| JP | 2011-117777 A | | 6/2011 | |
| JP | 2017187454 A | * | 10/2017 | |
| WO | WO-2007130295 A2 | * | 11/2007 | .......... G01N 21/274 |
| WO | WO-2015122237 A1 | * | 8/2015 | .......... G01J 3/0232 |
| WO | WO-2018186448 A1 | * | 10/2018 | ................ G01J 3/10 |

* cited by examiner

RATE OF CHANGE IN REFERENCE
SAMPLE FILM THICKNESS

ELAPSED TIME [h]

SAMPLE FILM THICKNESS
(CORRECTED)[μm]

ELAPSED TIME [h]

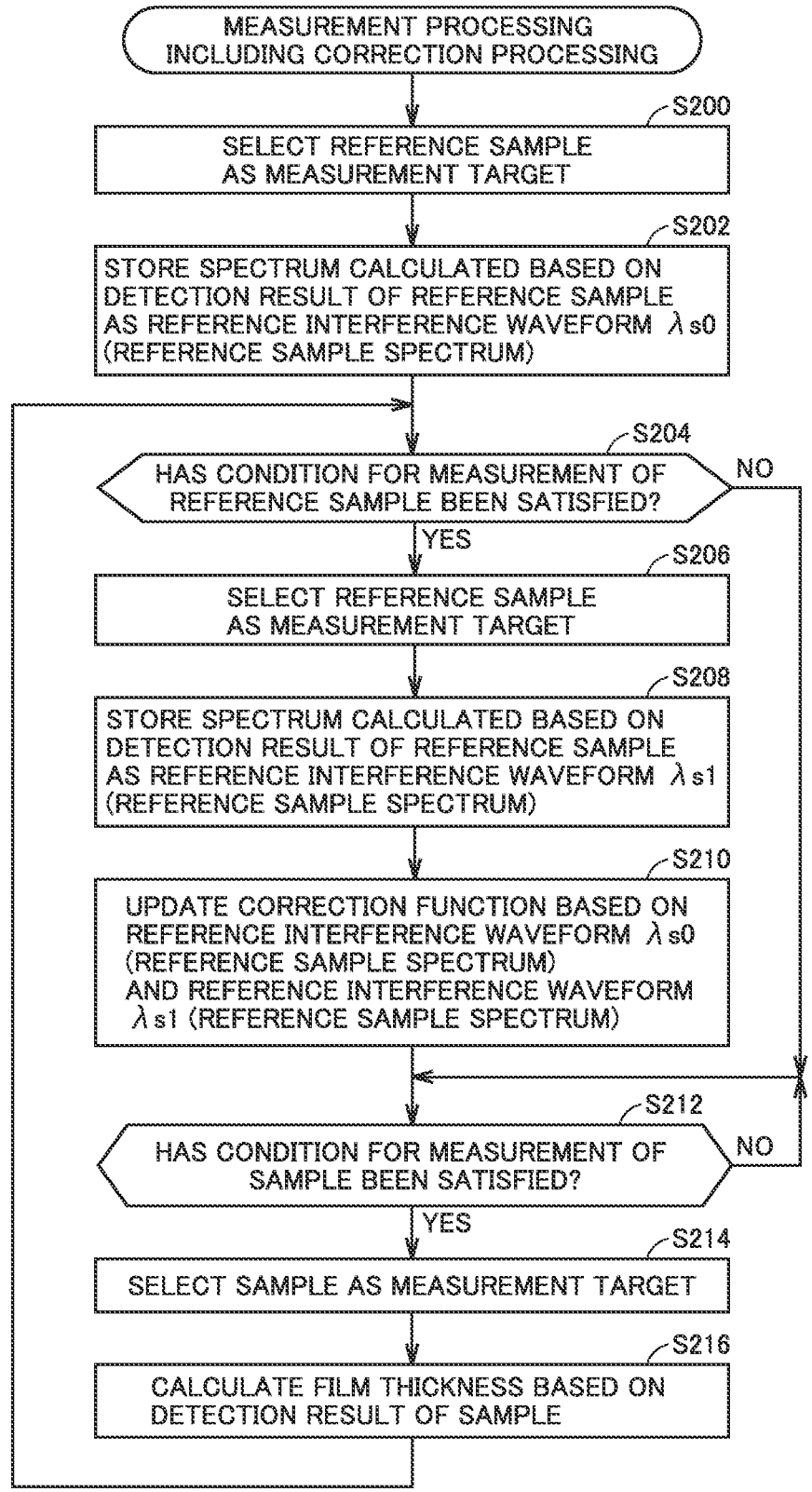

US 11,892,281 B2

OPTICAL MEASUREMENT SYSTEM, OPTICAL MEASUREMENT METHOD, AND NON-TRANSITORY STORAGE MEDIUM HAVING MEASUREMENT PROGRAM STORED THEREON

This nonprovisional application is based on Japanese Patent Application No. 2021-048379 filed with the Japan Patent Office on Mar. 23, 2021, the entire contents of which are hereby incorporated by reference.

BACKGROUND OF THE INVENTION

Field of the Invention

The present invention relates to an optical measurement system including a spectroscopic detector, an optical measurement method, and a non-transitory storage medium having a measurement program stored thereon.

Description of the Background Art

An optical measurement system that measures a film thickness or a surface profile of a sample by observing with a spectroscopic detector, interference produced as a result of irradiation of the sample with light has been known. Such an optical measurement system is also referred to as a spectral interference type.

There are factors that lower measurement accuracy in optical measurement. Therefore, various contrivances for improving measurement accuracy have been proposed.

For example, Japanese Patent Laying-Open No. 2002-039955 discloses an automatic optical measurement method capable of estimating a quantity of reference light without setting a reference reflector as the reference on an optical measurement path during sample measurement and hence enhancing measurement accuracy.

Japanese Patent Laying-Open No. 2011-117777 discloses a calibration apparatus that can appropriately acquire a correspondence relation between a detection position and a wavelength even if the correspondence relation between the wavelength and the detection position has varied due to aging or changes in the temperature.

As the spectroscopic detector is affected by variation in temperature, an error may be caused in a detection result from the spectroscopic detector. The automatic optical measurement method disclosed in above-described Japanese Patent Laying-Open No. 2002-039955 does not take into account, influence by variation in temperature. Though the calibration apparatus disclosed in above-described Japanese Patent Laying-Open No. 2011-117777 takes into account, influence by aging or changes in the temperature, it is directed to calibration using incident light including a bright line spectrum, and unable to lessen influence by changes in the temperature caused during measurement.

SUMMARY OF THE INVENTION

One of objects of the present invention is to provide a solution for reducing an error due to variation in temperature caused in a spectroscopic detector or the like in an optical measurement system including the spectroscopic detector.

An optical measurement system according to one aspect of the present invention includes a light source, a spectroscopic detector, a reference sample configured to maintain characteristics against variation in temperature, a switching mechanism that switches between a first optical path through which a sample to be measured is irradiated with light from the light source and light produced at the sample is guided to the spectroscopic detector and a second optical path through which the reference sample is irradiated with light from the light source and light produced at the reference sample is guided to the spectroscopic detector, and a processing unit that calculates, by performing correction processing based on change between a first detection result provided from the spectroscopic detector as a result of irradiation of the reference sample with light from the light source at first time and a second detection result provided from the spectroscopic detector by irradiation of the reference sample with light from the light source at the second time, a measurement value of the sample from a third detection result provided from the spectroscopic detector as a result of irradiation of the sample with light from the light source at third time temporally proximate to second time.

The correction processing may be based on change of the second detection result with the first detection result being defined as a reference.

The processing unit may include a module that calculates a film thickness based on a detection result provided from the spectroscopic detector and a module that calculates the measurement value of the sample by reflecting a rate of change from a first film thickness calculated from the first detection result to a second film thickness calculated from the second detection result on a third film thickness calculated from the third detection result.

The processing unit may include a module that associates a wavelength with a detection result provided from the spectroscopic detector by referring to wavelength calibration information and a module that corrects the wavelength calibration information based on a difference between a result of association of the wavelength with the first detection result and a result of association of the wavelength with the second detection result.

A heat-insulating structure may be provided around the reference sample.

The reference sample may be composed of a material with which temperature dependency is substantially ignorable.

The switching mechanism may include an optical switch provided on an optical path between the light source, and the sample and the reference sample.

The switching mechanism may include an optical shutter that selectively cuts off any one of an optical path from the light source to the sample and an optical path from the light source to the reference sample.

An optical measurement method according to another aspect of the present invention includes obtaining a first detection result provided from a spectroscopic detector as a result of irradiation of a reference sample with light from a light source at first time. The reference sample is configured to maintain characteristics against variation in temperature. The optical measurement method includes obtaining a second detection result provided from the spectroscopic detector as a result of irradiation of the reference sample with light from the light source at second time, obtaining a third detection result provided from the spectroscopic detector as a result of irradiation of a sample with light from the light source at third time temporally proximate to the second time, and calculating a measurement value of the sample from the third detection result by performing correction processing based on change between the first detection result and the second detection result.

According to yet another aspect of the present invention, a non-transitory storage medium having a measurement program for measurement of a sample stored thereon is provided. The measurement program causes a computer to perform obtaining a first detection result provided from a spectroscopic detector as a result of irradiation of a reference sample with light from a light source at first time. The reference sample is configured to maintain characteristics against variation in temperature. The measurement program causes the computer to perform obtaining a second detection result provided from the spectroscopic detector as a result of irradiation of the reference sample with light from the light source at second time, obtaining a third detection result provided from the spectroscopic detector as a result of irradiation of a sample with light from the light source at third time temporally proximate to the second time, and calculating a measurement value of the sample from the third detection result by performing correction processing based on change between the first detection result and the second detection result.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 15A and 15B to 18A and 18B are diagrams each showing an exemplary interference waveform used in correction processing in the optical measurement system according to the present embodiment.

FIG. 19 is a flowchart showing a processing procedure involved with measurement processing including another correction processing in the optical measurement system according to the present embodiment.

DESCRIPTION OF THE PREFERRED EMBODIMENTS

Figure 1:
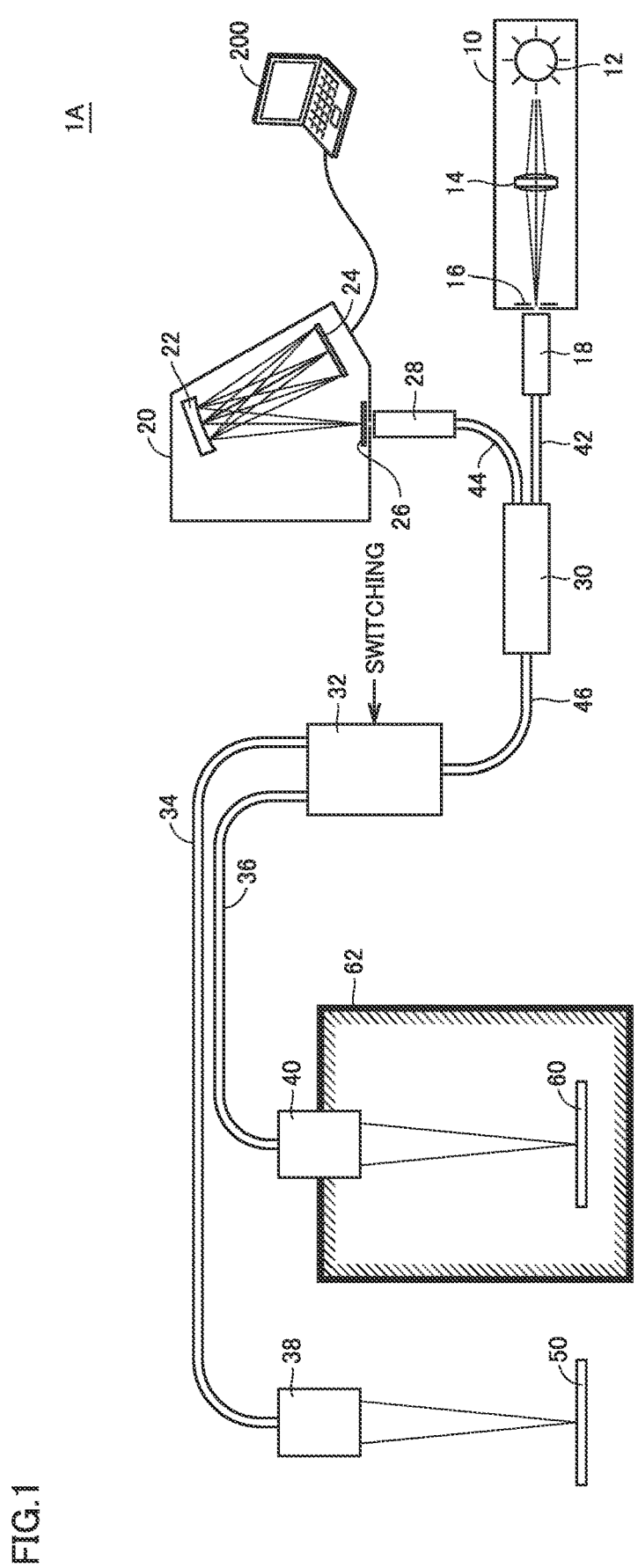
FIG. 1 is a schematic diagram showing an exemplary configuration of an optical measurement system according to the present embodiment.

An embodiment of the present invention will be described in detail with reference to the drawings. The same or corresponding elements in the drawings have the same reference characters allotted and description thereof will not be repeated.

Though a spectral interference film thickness measurement system will mainly be described as a typical example of an optical measurement system according to the present embodiment, any optical system may be adopted so long as a spectroscopic detector is used. Though an optical system (a reflected light observation system) that emits light to a sample (a sample 50 which will be described later) to be measured and observes reflected light is exemplified in the description below, an optical system (a transmitted light observation system) that emits light to a sample to be measured and observes transmitted light is also naturally applicable.

A. Overview

Referring to FIG. 1, an optical measurement system 1A includes a light source 10 that generates light with which a sample 50 is irradiated and a spectroscopic detector 20 that receives light (reflected light or transmitted light) produced at sample 50.

Light source 10 includes a light emitter 12 that generates light having a prescribed wavelength range, a condensing lens 14, and an aperture 16. The wavelength range of light generated from light emitter 12 is arbitrarily determined depending on a measurement range or a material for sample 50. For example, a halogen lamp or a white LED may be adopted as light emitter 12. Alternatively, an amplified spontaneous emission (ASE) light source that generates measurement light containing components in a near infrared region may be adopted as light emitter 12. When the ASE light source is adopted, light source 10 is connected to an optical fiber with an optical element such as an isolator or a coupler being interposed, and hence condensing lens 14 and aperture 16 do not have to be provided.

Spectroscopic detector 20 includes a diffraction grating 22 that diffracts incident light, a light reception element 24 that includes a plurality of channels arranged in association with diffraction grating 22, and a slit 26 for concentration of light incident on diffraction grating 22. Light reception element 24 is implemented by a line sensor or a two-dimensional sensor, and it provides intensity for each wavelength as output of a detection result. In other words, the detection result represents intensity of light at each position on a light receiving surface of light reception element 24. Instead of diffraction grating 22, a prism spectroscope may be adopted.

A coupler 30 has one end connected to light source 10 and spectroscopic detector 20. More specifically, light source 10 is connected to coupler 30 through a connector 18 and an optical fiber 42. Spectroscopic detector 20 is connected to coupler 30 through a connector 28 and an optical fiber 44.

Coupler 30 has the other end connected to one end of an optical switch 32 through an optical fiber 46.

Optical switch 32 has the other end connected to a light projection and reception head 38 through an optical fiber 34 and connected to a light projection and reception head 40 through an optical fiber 36.

Optical switch 32 is provided on an optical path between light source 10, and sample 50 and a reference sample 60. More specifically, optical switch 32 allows optical connection between optical fiber 46 connected to one end thereof and one of optical fiber 34 and optical fiber 36 connected to the other end thereof, in accordance with a switching instruction from a processing apparatus 200 or the like.

The optical element included in the optical measurement system according to the present embodiment is not limited to those illustrated, and any optical element that performs an aimed function can be adopted. For example, instead of coupler 30, a circulator or a beam splitter may be adopted. This is also applicable to each embodiment which will be described below.

Figure 2:
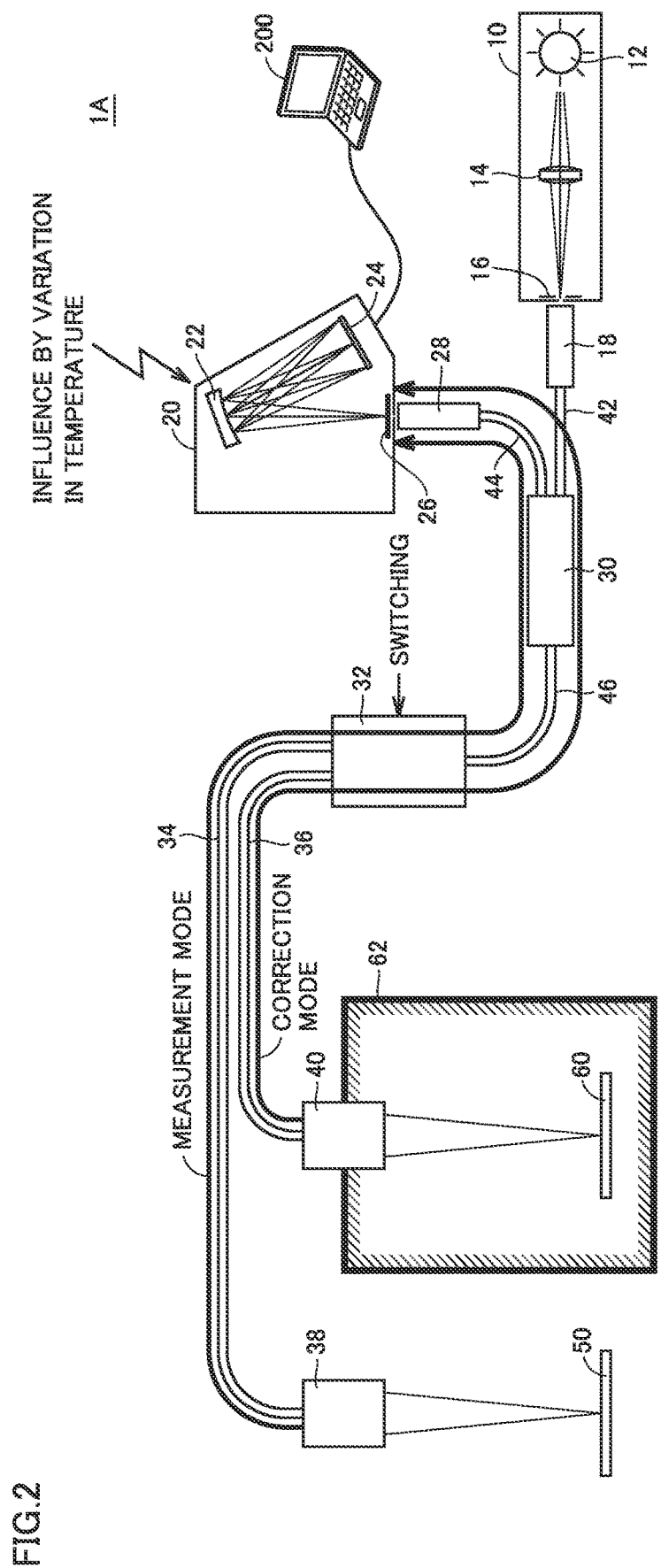
FIG. 2 is a diagram for illustrating operations in measurement by the optical measurement system shown in FIG. 1.

Referring to FIG. 2, in a measurement mode in which sample 50 is measured, optical switch 32 allows optical connection between optical fiber 46 and optical fiber 34. Thus, light generated from light source 10 enters coupler 30 through connector 18 and optical fiber 42, further passes through optical fiber 46, optical switch 32, and optical fiber 34, and is emitted from light projection and reception head 38 to sample 50.

Reflected light produced as a result of irradiation of sample 50 with light enters light projection and reception head 38, thereafter passes through optical fiber 34, optical switch 32, and optical fiber 46, and reaches coupler 30. Reflected light from sample 50 is further guided by coupler 30 to optical fiber 44 and connector 28 and enters spectroscopic detector 20.

Finally, a result of detection by spectroscopic detector 20 is given to processing apparatus 200. Processing apparatus 200 calculates a measurement value of a film thickness or the like of sample 50 based on a detection result from spectroscopic detector 20.

The "film thickness" herein means a thickness of a specific layer included in any sample (or a reference sample). When the sample (or the reference sample) is composed of a uniform material like a wafer, such a composition is equivalent to a structure made only of a single layer and the measured film thickness means a thickness of the entire sample (or reference sample). In other words, the "film thickness" herein does not mean only a thickness of each layer included in a sample having a layered structure but may mean a thickness of the entire sample.

In optical measurement system 1A shown in FIGS. 1 and 2, there may be, for example, influence by variation in temperature onto a measurement system including spectroscopic detector 20. In the optical measurement system of the spectral interference type, it is important to maintain accuracy of a measured optical distance. In other words, variation in result of measurement of the optical distance may lead to an error in an output measurement value of a film thickness or the like. Such influence on the measured optical distance typically greatly originates from variation in temperature in an environment where a measurement system including spectroscopic detector 20 is provided.

Then, in the optical measurement system according to the present embodiment, in order to correct influence by variation in temperature caused in the measurement system including spectroscopic detector 20, reference sample 60 (or a reference sample 60S which will be described later) is employed.

In optical measurement system 1A shown in FIGS. 1 and 2, reference sample 60 is arranged to be irradiated with light from light projection and reception head 40. Furthermore, a heat-insulating structure 62 for minimizing influence by variation in temperature is provided around reference sample 60. By providing heat-insulating structure 62, influence by variation in temperature onto reference sample 60 is suppressed to an ignorable level. In other words, reference sample 60 is configured to maintain characteristics such as a film thickness in an initial state (a reference state) even when an ambient temperature of optical measurement system 1A varies. Reference sample 60 is thus configured to maintain characteristics against variation in temperature. Optical measurement system 1A performs correction processing for lessening influence by variation in temperature, by using a detection result of reference sample 60.

In a correction mode in which reference sample 60 is measured, optical switch 32 allows optical connection between optical fiber 46 and optical fiber 36. Light generated from light source 10 thus passes through optical fiber 36 and light projection and reception head 40 rather than optical fiber 34 and light projection and reception head 38. Then, light from light source 10 is emitted from light projection and reception head 40 to reference sample 60.

Reflected light produced as a result of irradiation of reference sample 60 with light enters light projection and reception head 40, thereafter passes through optical fiber 36, optical switch 32, and optical fiber 46, and reaches coupler 30. Furthermore, reflected light from light source 10 is guided by coupler 30 to optical fiber 44 and connector 28 and enters spectroscopic detector 20. A detection result obtained from light from reference sample 60 is given to processing apparatus 200. Processing apparatus 200 corrects a measurement value of a film thickness or the like of sample 50 through correction processing based on the detection result of reference sample 60.

As shown in FIG. 2, optical measurement system 1A includes a switching mechanism that switches between an optical path (a first optical path) in the measurement mode through which sample 50 to be measured is irradiated with light from light source 10 and light produced at sample 50 is guided to spectroscopic detector 20 and an optical path (a second optical path) in the correction mode through which reference sample 60 is irradiated with light from light source 10 and light produced at reference sample 60 is guided to spectroscopic detector 20.

Figure 3:
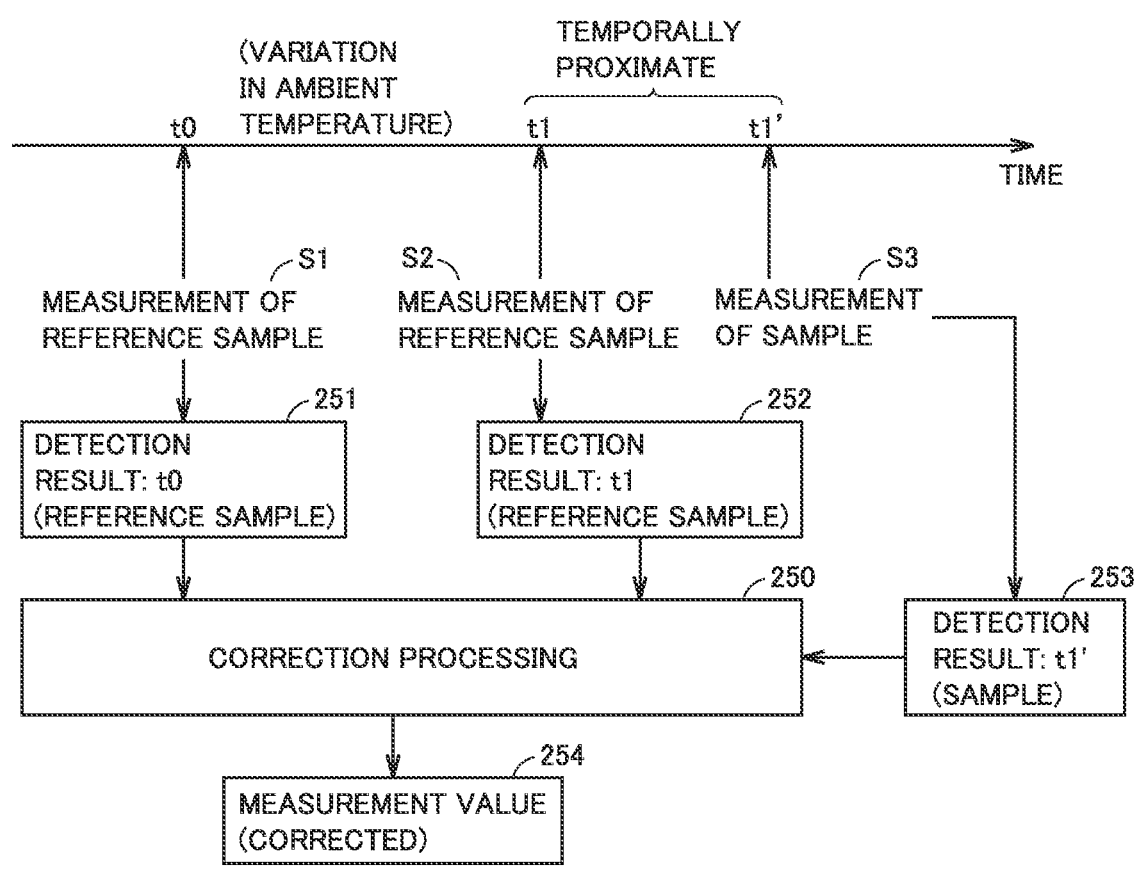
FIG. 3 is a diagram for illustrating correction processing in the optical measurement system according to the present embodiment.

Referring to FIG. 3, the optical measurement system measures reference sample 60 at reference time t0 which is time set to come before start of measurement (step S1: measurement of reference sample). By measurement of reference sample 60, a detection result 251 at reference time t0 can be obtained.

Thereafter, the optical measurement system measures reference sample 60 at any measurement time t1 (step S2: measurement of reference sample) and measures sample 50 at any measurement time t1' (=t1±Δt) (step S3: measurement of sample). By measurement of reference sample 60, a detection result 252 at measurement time t1 can be obtained, and by measurement of sample 50, a detection result 253 at measurement time t1' can be obtained. Measurement time t1 and measurement time t1' are assumed as being temporally proximate to each other.

"Being temporally proximate" herein means being within a temporal range within which a difference in ambient temperature is ignorable in any environment where a temperature may vary over time. In other words, a detection result of reference sample 60 and a detection result of sample 50 obtained within a range of times "temporally proximate" to each other can be regarded as detection results at a substantially identical ambient temperature. Therefore, with the detection result of reference sample 60, influence by variation in temperature included in the detection result of reference sample 60 (that is, influence by variation in temperature included in the result of detection of sample 50) can be corrected.

The optical measurement system lessens influence by variation in temperature in detection result 253 of sample 50 at measurement time t1' through correction processing 250 based on detection result 251 of reference sample 60 at reference time t0 and detection result 252 of reference sample 60 at measurement time t1, and then calculates a measurement value 254 of a film thickness or the like of sample 50. Correction processing 250 is performed based on change of detection result 252 at measurement time t1 with detection result 251 at reference time t0 being defined as the reference.

Thus, the optical measurement system according to the present embodiment calculates measurement value 254 of sample 50 based on detection result 253 (third detection result) provided from spectroscopic detector 20 as a result of irradiation of sample 50 with light from light source 10 at measurement time t1' (third time) temporally proximate to measurement time t1 (second time) by performing correction processing 250 based on detection result 251 (first detection result) provided from spectroscopic detector 20 as a result of irradiation of reference sample 60 with light from light source 10 at reference time t0 (first time) and detection result 252 (second detection result) provided from spectroscopic detector 20 as a result of irradiation of reference sample 60 with light from light source 10 at measurement time t1 (second time).

The optical measurement system according to the present embodiment cancels influence by variation in temperature in the measurement system including spectroscopic detector 20 and improves accuracy in measurement of sample 50 by correcting the detection result of sample 50 with reference sample 60 arranged in an environment (for example, heat-insulating structure 62) where influence by variation in temperature is suppressed to an ignorable level and/or reference sample 60S (which will be described later) composed of a material with which influence by variation in temperature is ignorable.

A position where reference sample 60 is arranged may be set in the inside or on the outside of a measurement apparatus.

Though FIG. 3 shows an example in which sample 50 is measured after measurement of reference sample 60 at any measurement time t1, sample 50 and reference sample 60 may be measured in any order so long as times of measurement are temporally proximate to each other.

A plurality of detection results 253 obtained by measurement of a plurality of samples 50 may be corrected with detection result 252 obtained by measurement of reference sample 60 at any measurement time t1. Reference sample 60 to be used for correction processing 250 may be measured, for example, each time prescribed number of times of measurement are conducted or every prescribed measurement period.

Further alternatively, correction processing 250 may be performed by using a plurality of detection results 252 obtained in a plurality of times of measurement of reference sample 60.

When correction of relative change in measurement value with variation in ambient temperature suffices, any time point before start of measurement should only be set as reference time t0. When absolute change in measurement value with variation in ambient temperature should be corrected, on the other hand, an environment similar to an environment where spectroscopic detector 20 was subjected to wavelength calibration should be maintained and detection result 251 (first detection result) should be obtained while spectroscopic detector 20 is stable. In other words, reference time t0 is set to any time while an environment similar to the environment where spectroscopic detector 20 was subjected to wavelength calibration is maintained and spectroscopic detector 20 is stable.

As described above, the optical measurement system according to the present embodiment cancels influence by variation in temperature onto the measurement system including spectroscopic detector 20 and improves accuracy in measurement of sample 50 by using a result of detection of reference sample 60 (or reference sample 60S) obtained while influence by variation in temperature is ignorable. Details of correction processing 250 will be described later.

B. Exemplary Configuration of Optical Measurement System

Some exemplary configurations of the optical measurement system according to the present embodiment in addition to optical measurement system 1A shown in FIG. 1 will now be described.

b1: Optical Measurement System 1B

Figure 4:
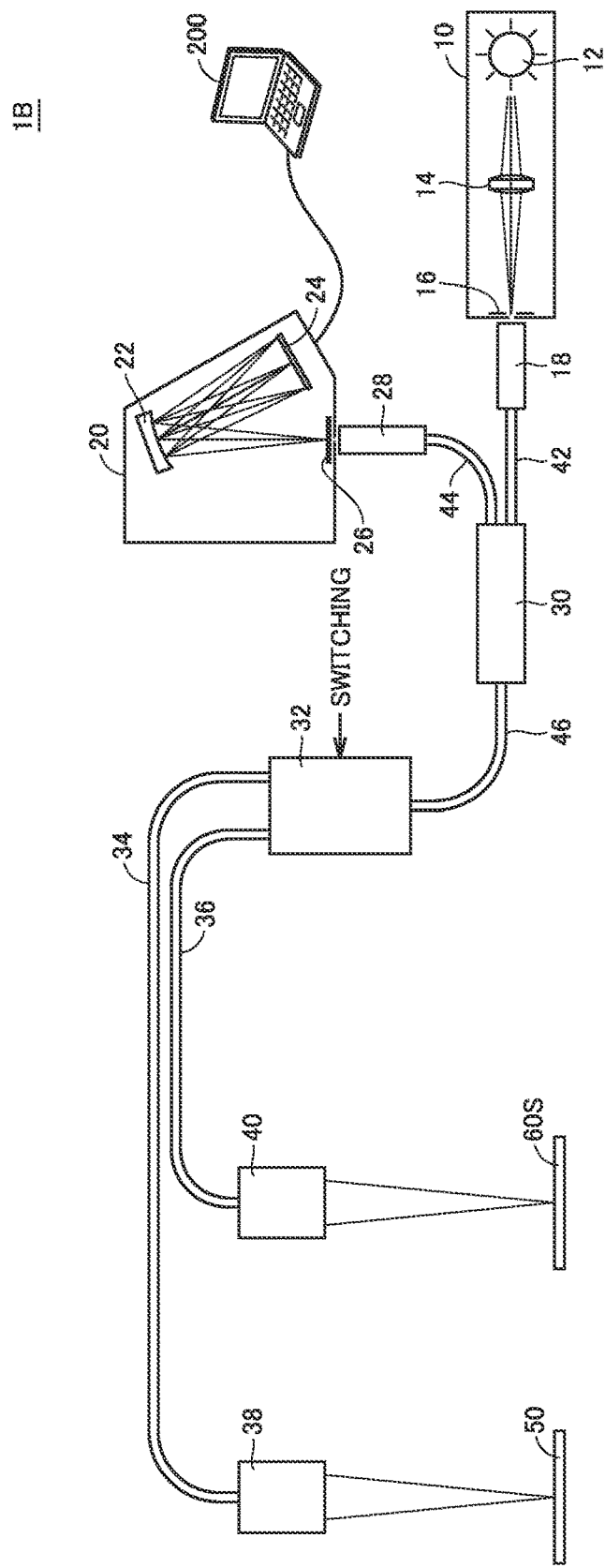
FIGS. 4 to 8 are schematic diagrams each showing an exemplary configuration of the optical measurement system according to the present embodiment.

An optical measurement system 1B shown in FIG. 4 is different from optical measurement system 1A shown in FIG. 1 in that reference sample 60 is changed to reference sample 60S and heat-insulating structure 62 is removed.

Reference sample 60S is configured to maintain characteristics against variation in temperature. More specifically, reference sample 60S is composed of a material with which influence by variation in temperature that may occur during measurement of sample 50 is ignorable. In other words, reference sample 60S is composed of a material with which temperature dependency is substantially ignorable, and it is extremely low in temperature dependency of its characteristics. Therefore, heat-insulating structure 62 as shown in FIG. 1 does not have to be provided.

Even when the ambient temperature of optical measurement system 1B varies, reference sample 60S maintains characteristics such as a film thickness in the initial state (reference state). Optical measurement system 1B performs correction processing for lessening influence by variation in temperature by using the detection result of reference sample 60S.

Since optical measurement system 1B is otherwise similar in configuration and processing to optical measurement system 1A shown in FIG. 1, detailed description will not be repeated.

b2: Optical Measurement System 1C

Figure 5:
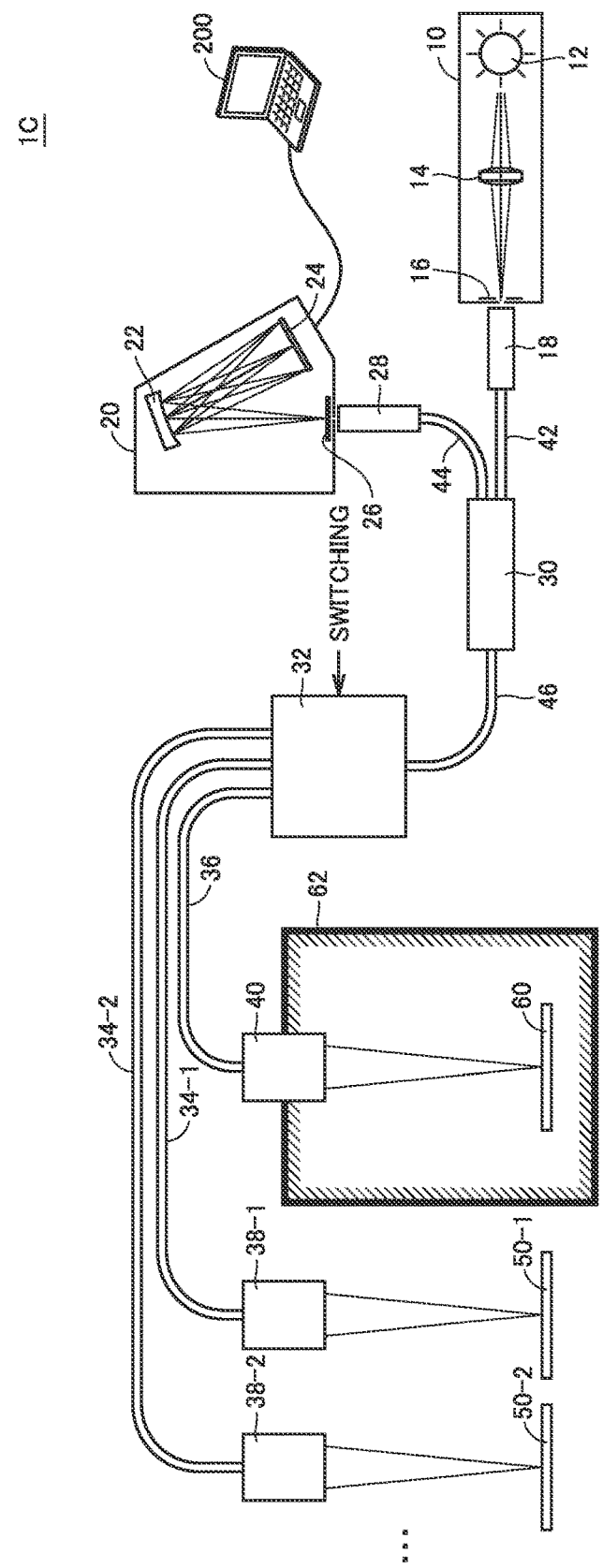

An optical measurement system 1C shown in FIG. 5 is different from optical measurement system 1A shown in FIG. 1 in that a plurality of sets of optical fiber 34 and light projection and reception head 38 are arranged. In other words, optical switch 32 has the other end connected to a light projection and reception head 38-1 for emission of light to a sample 50-1 through an optical fiber 34-1 and connected to a light projection and reception head 38-2 for emission of light to a sample 50-2 through an optical fiber 34-2.

Optical switch 32 allows optical connection of any one of light projection and reception heads 38-1 and 38-2 and light projection and reception head 40 to optical fiber 46.

Since optical measurement system 1C is otherwise similar in configuration and processing to optical measurement system 1A shown in FIG. 1, detailed description will not be repeated.

b3: Optical Measurement System 1D

Figure 6:
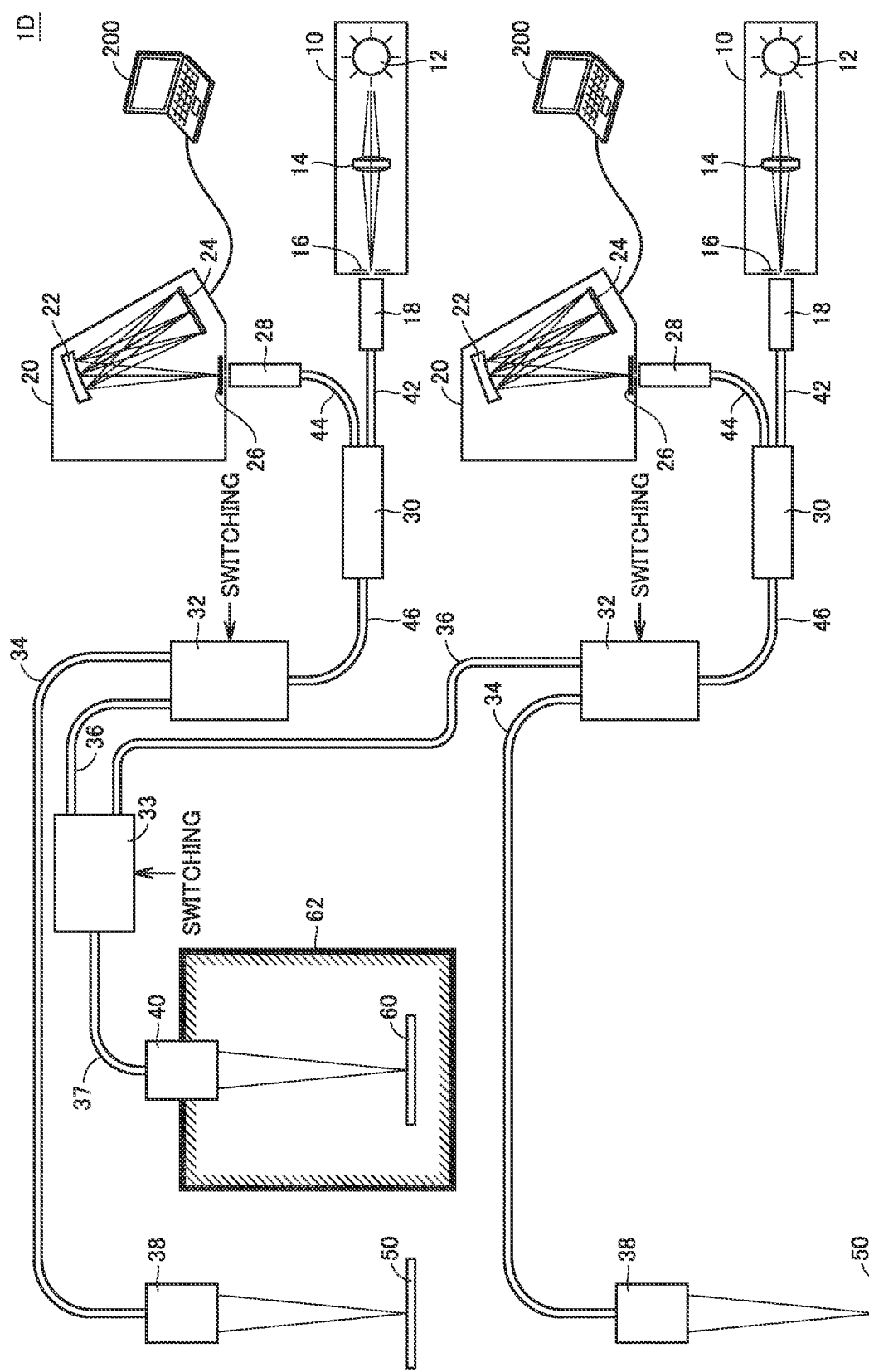

An optical measurement system 1D shown in FIG. 6 includes a plurality of systems corresponding to optical measurement system 1A shown in FIG. 1 and uses reference sample 60 in common among the plurality of optical measurement systems.

More specifically, optical measurement system 1D includes an optical switch 33 to which a plurality of optical fibers 36 are connected. Optical switch 33 is also provided on an optical path between light source 10, and sample 50 and reference sample 60. More specifically, optical switch 33 allows optical connection between one of the plurality of optical fibers 36 connected to one end thereof and an optical fiber 37 in accordance with a switching instruction from processing apparatus 200 or the like. In other words, one selected optical fiber 36 of the plurality of optical fibers 36 can be used for measurement of reference sample 60.

Since optical measurement system 1D is otherwise similar in configuration and processing to optical measurement system 1A shown in FIG. 1, detailed description will not be repeated.

b4: Modification of Optical Measurement Systems 1A to 1D

Without being limited to the configurations of the optical measurement systems shown in FIGS. 1 and 4 to 6 described above, a modification as below may be adopted.

Though FIGS. 5 and 6 described above each illustrate a configuration including reference sample 60 and heat-insulating structure 62, reference sample 60S as shown in FIG. 4 may be adopted.

Though FIG. 5 described above shows an exemplary configuration including two light projection and reception heads 38 that emit light to sample 50, a larger number of light projection and reception heads 38 may be arranged.

Though FIG. 6 described above shows an exemplary configuration including two sets of light source 10 and spectroscopic detector 20, a larger number of sets of light source 10 and spectroscopic detector 20 may be arranged. Alternatively, rather than a set of light source 10 and spectroscopic detector 20, a plurality of light sources 10 alone or a plurality of spectroscopic detectors 20 alone may be arranged.

As in optical measurement system 1C shown in FIG. 5, a plurality of light projection and reception heads 38 that emit light to sample 50 may be arranged also in the configuration shown in FIG. 6 described above.

In any configuration, by allowing a plurality of light sources 10 or a plurality of spectroscopic detectors 20 to share a configuration for measuring reference sample 60 or reference sample 60S, the configuration can be simplified and cost can be reduced.

b5: Optical Measurement System 1E

Figure 7:
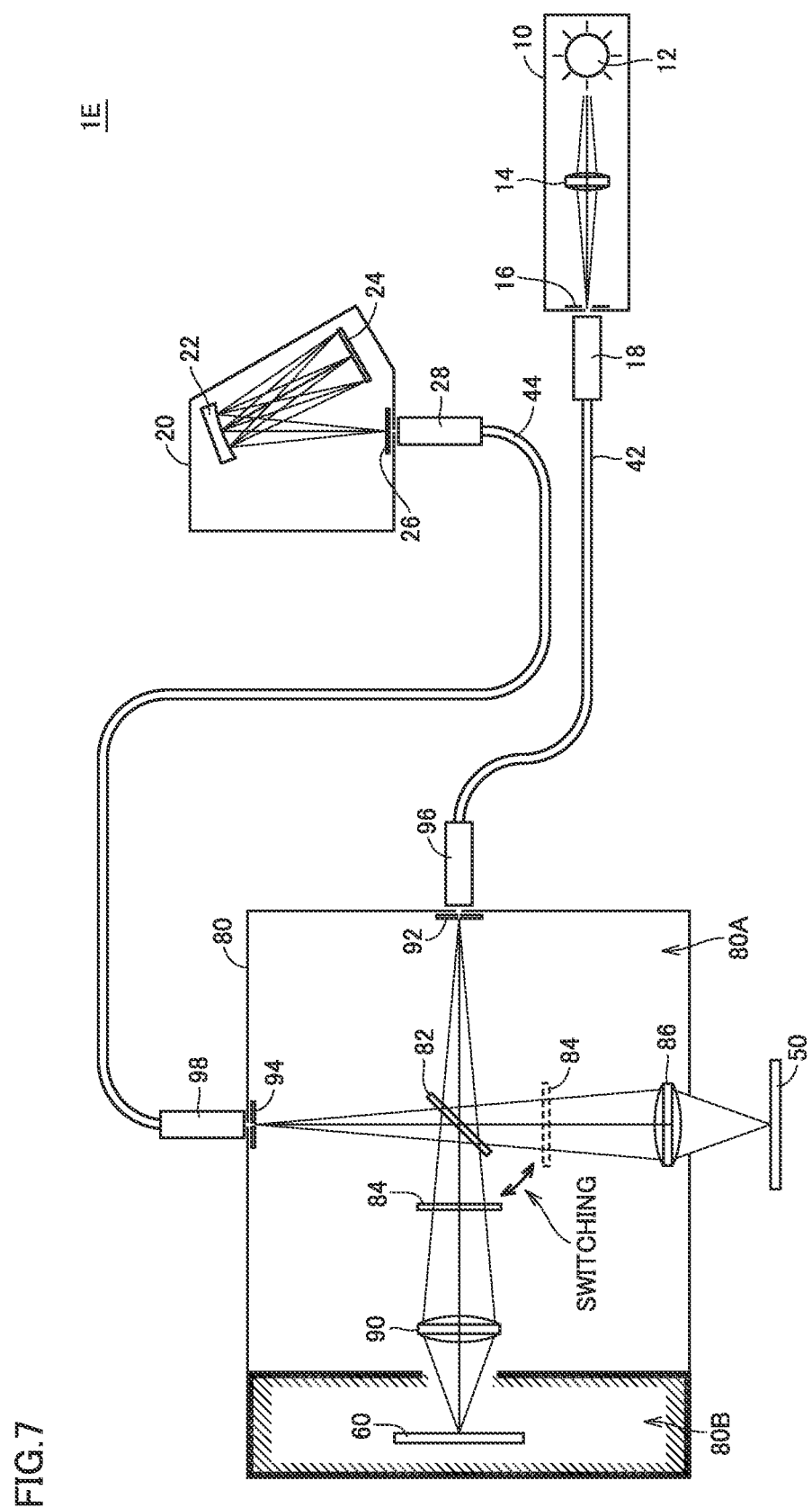

An optical measurement system 1E shown in FIG. 7 includes a measurement housing 80 in addition to light source 10 and spectroscopic detector 20.

Light source 10 is connected to one surface of measurement housing 80 through connector 18, optical fiber 42, and a connector 96. Spectroscopic detector 20 is connected to another surface of measurement housing 80 through connector 28, optical fiber 44, and a connector 98.

Measurement housing 80 includes a measurement chamber 80A and a reference sample chamber 80B. Measurement chamber 80A of measurement housing 80 is provided with an aperture 92 in correspondence with an opening in connector 96 and with an aperture 94 in correspondence with an opening in connector 98. Measurement housing 80 includes a beam splitter 82. Each of aperture 92 and aperture 94 is arranged at a position corresponding to the center of beam splitter 82.

A condensing lens 86 and a condensing lens 90 are each arranged in correspondence with an optical axis that passes through the center of beam splitter 82. Sample 50 is arranged in alignment with a focal position of condensing lens 86 and reference sample 60 is arranged in alignment with a focal position of condensing lens 90. Reference sample 60 is accommodated in reference sample chamber 80B of measurement housing 80.

A heat-insulating structure for minimizing influence by variation in temperature is adopted for reference sample chamber 80B of measurement housing 80. In other words, a heat-insulating structure is provided around reference sample 60.

An optical shutter 84 is provided on an optical path from beam splitter 82 to each of condensing lens 86 and condensing lens 90. Optical shutter 84 selectively cuts off any one of an optical path from light source 10 to sample 50 and an optical path from light source 10 to reference sample 60.

More specifically, optical shutter 84 cuts off any one of an optical path from beam splitter 82 to condensing lens 86 and an optical path from beam splitter 82 to condensing lens 90 in accordance with a switching instruction from processing apparatus 200 or the like. In other words, optical shutter 84 guides light from light source 10 emitted through connector 96 and aperture 92 to any one of sample 50 and reference sample 60.

In the measurement mode in which sample 50 is measured, optical shutter 84 is driven toward condensing lens 90. Light generated from light source 10 thus enters measurement housing 80 through connector 18, optical fiber 42, and connector 96, is further reflected by beam splitter 82, and is guided to condensing lens 86. Then, light from light source 10 is condensed by condensing lens 86 and emitted to sample 50.

Reflected light produced by irradiation of sample 50 with light is converted to converged light by condensing lens 86, thereafter passes through beam splitter 82, aperture 94, connector 98, optical fiber 44, and connector 28, and enters spectroscopic detector 20. A detection result obtained from light from sample 50 is given to processing apparatus 200.

In the correction mode in which reference sample 60 is measured, optical shutter 84 is driven toward condensing lens 86. Light generated from light source 10 thus enters measurement housing 80 through connector 18, optical fiber 42, and connector 96, further passes through beam splitter 82, and is guided to condensing lens 90. Then, light from light source 10 is condensed by condensing lens 90 and emitted to reference sample 60.

Reflected light produced by irradiation of reference sample 60 with light is converted to converged light by condensing lens 90, thereafter reflected by beam splitter 82, further passes through aperture 94, connector 98, optical fiber 44, and connector 28, and enters spectroscopic detector 20. A detection result obtained from light from reference sample 60 is given to processing apparatus 200.

Processing apparatus 200 corrects a measurement value of a film thickness or the like of sample 50 based on the detection result of reference sample 60 through processing as will be described later.

b6: Optical Measurement System 1F

Figure 8:
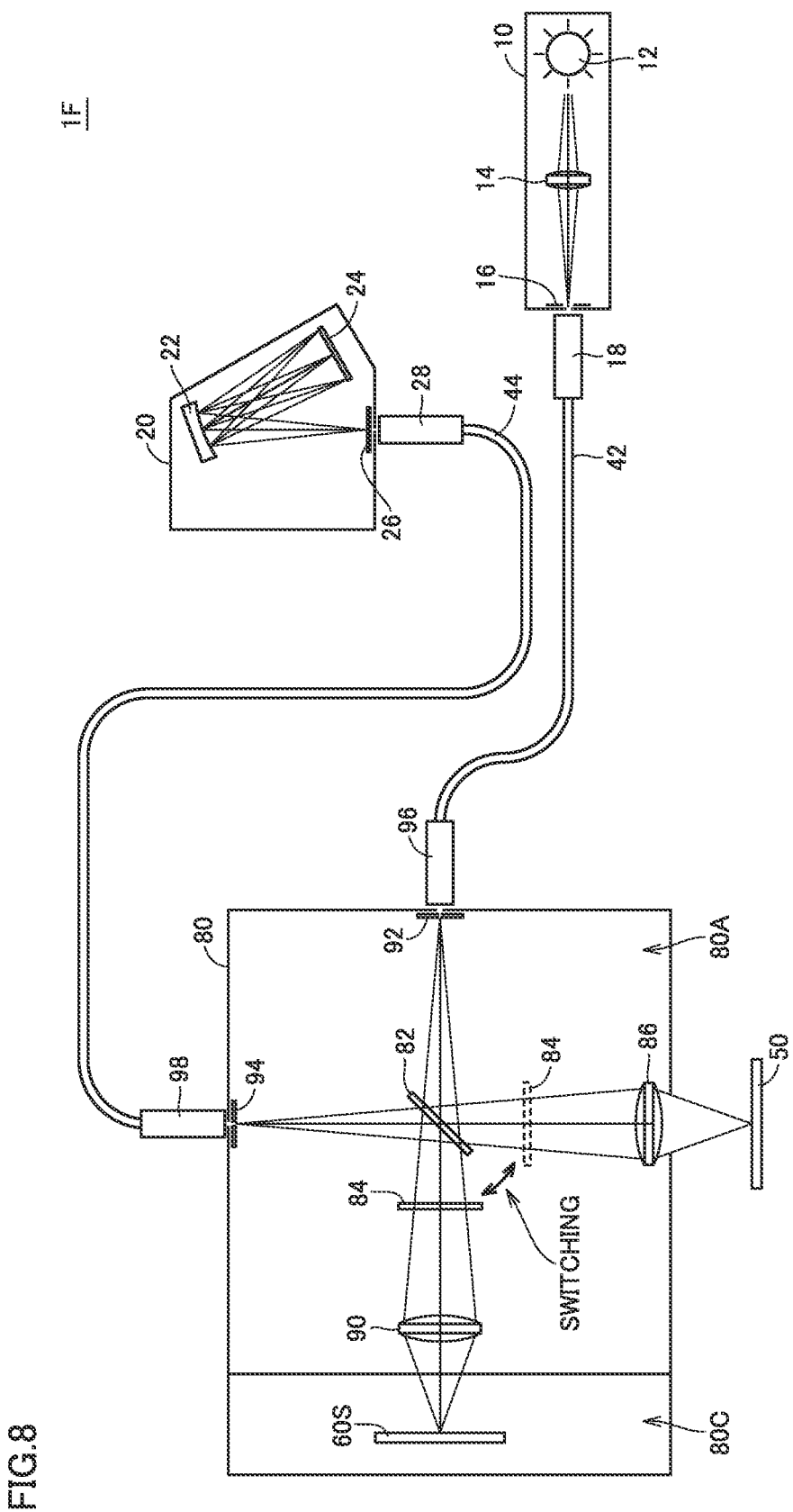

An optical measurement system 1F shown in FIG. 8 is different from optical measurement system 1E shown in FIG. 7 in that reference sample 60 is changed to reference sample 60S and a reference sample chamber 80C without including a heat-insulating structure is provided instead of reference sample chamber 80B for which a heat-insulating structure is adopted.

Reference sample 60S is composed of a material with which influence by variation in temperature that may occur during measurement of sample 50 is ignorable. In other words, reference sample 60S is extremely low in temperature dependency. Therefore, it is not necessary to adopt the heat-insulating structure as shown in FIG. 7 and to provide reference sample chamber 80B. Even when the ambient temperature of optical measurement system 1F varies, reference sample 60S maintains characteristics such as a film thickness in the initial state (reference state).

Since optical measurement system 1F is otherwise similar in configuration and processing to optical measurement system 1E shown in FIG. 7, detailed description will not be repeated.

b7: Modification of Optical Measurement Systems 1E and 1F

Without being limited to the configurations of the optical measurement systems shown in FIGS. 7 and 8 described above, a modification as below may be adopted.

In the optical measurement systems shown in FIGS. 7 and 8 described above, measurement housing 80 and light source 10 are connected to each other through the optical fiber and measurement housing 80 and spectroscopic detector 20 are connected to each other through the optical fiber. Measurement housing 80 and light source 10, however, may directly be connected to each other or measurement housing 80 and spectroscopic detector 20 may directly be connected to each other, by not providing one of the optical fibers or by providing neither of them.

b8: Modification of Heat-Insulating Structure

Any material can be employed as a heat-insulating material to be used for the heat-insulating structure. Any design may be applicable as appropriate in consideration of required heat-insulating performance, weight, volume, or cost.

In addition to or instead of the heat-insulating structures shown in FIGS. 2, 5, 6, and 7, a temperature adjustment mechanism may be adopted. Any configuration including a Peltier element or a heat pump can be adopted as the temperature adjustment mechanism.

C. Exemplary Configuration of Processing Apparatus 200

Figure 9:
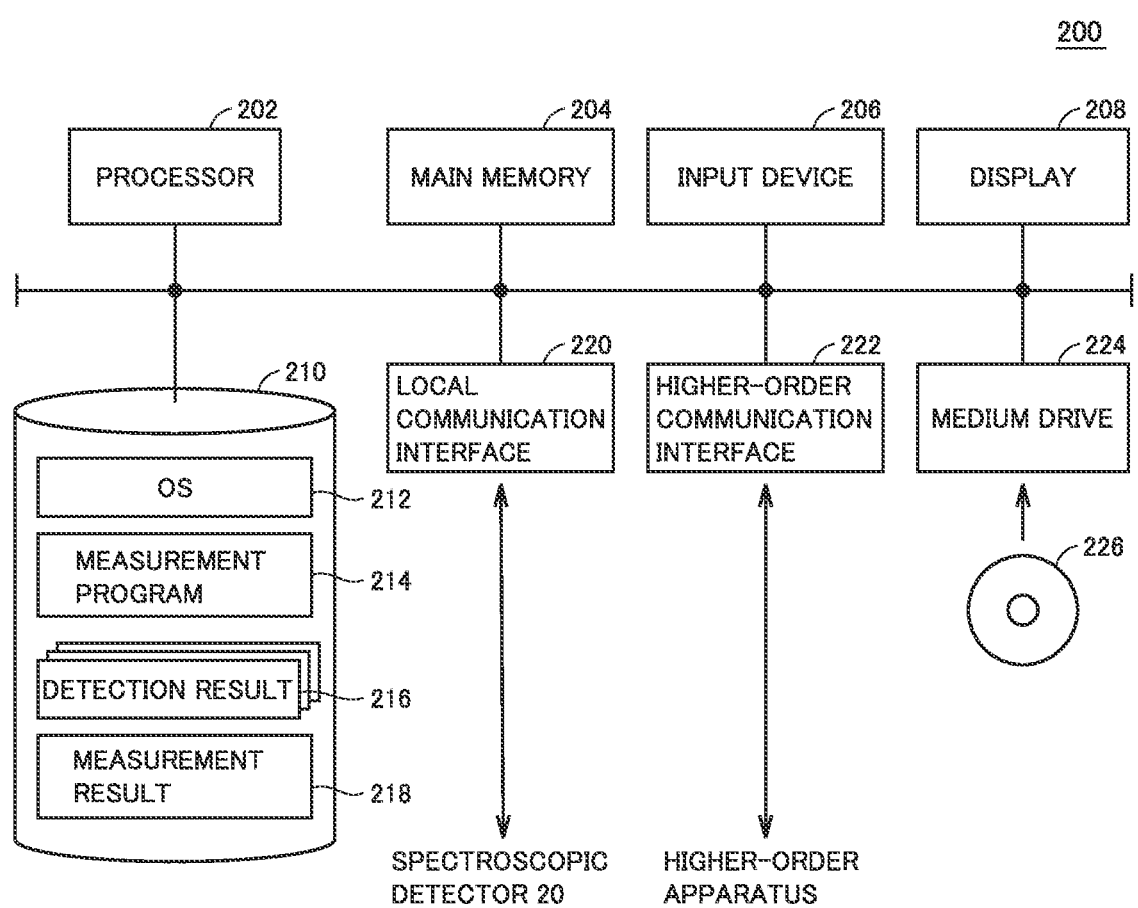
FIG. 9 is a schematic diagram showing an exemplary configuration of a processing apparatus included in the optical measurement system according to the present embodiment.

Referring to FIG. 9, processing apparatus 200 includes a processor 202, a main memory 204, an input device 206, a display 208, a storage 210, a local communication interface 220, a higher-order communication interface 222, and a medium drive 224.

Processor 202 is typically a computing processing unit such as a central processing unit (CPU) or a graphics processing unit (GPU), and it reads one program or a plurality of programs stored in storage 210 on main memory 204 and executes the same. Main memory 204 is a volatile memory such as a dynamic random access memory (DRAM) or a static random access memory (SRAM), and functions as a working memory for execution of a program by processor 202.

Input device 206 includes a keyboard, a mouse, and the like and accepts an operation from a user. Display 208 provides output of a result of execution of a program by processor 202 to a user.

Storage 210 is implemented by a non-volatile memory such as a hard disk or a flash memory, and various programs and data are stored therein. More specifically, an operating system (OS) 212, a measurement program 214, a detection result 216, and a measurement result 218 are held in storage 210.

Operating system 212 provides an environment where processor 202 executes a program. Measurement program 214 implements an optical measurement method according to the present embodiment by being executed by processor 202. Detection result 216 includes data provided from spectroscopic detector 20. Measurement result 218 includes one measurement value or a plurality of measurement values obtained by execution of measurement program 214.

Local communication interface 220 mediates data transmission between processing apparatus 200 and spectroscopic detector 20.

Higher-order communication interface 222 mediates data transmission to a higher-order apparatus such as a manufacturing apparatus. For example, higher-order communication interface 222 can accept an operation from a user for the higher-order apparatus and can also provide a result of execution of a program by processor 202 to the user through the higher-order apparatus.

Medium drive 224 reads necessary data from a non-transitory storage medium 226 (for example, an optical disc) where a program to be executed by processor 202 is stored and has the data stored in storage 210. Measurement program 214 executed in processing apparatus 200 may be installed through non-transitory storage medium 226 or downloaded from a server apparatus through higher-order communication interface 222.

Measurement program 214 may perform processing by calling a necessary module out of program modules provided as a part of operating system 212 in a prescribed sequence and at prescribed timing. In such a case, measurement program 214 not including the modules is also encompassed in the technical scope of the present invention. Measurement program 214 may be provided as being incorporated as a part of another program.

All or some of functions provided by execution of a program by processor 202 of processing apparatus 200 may be implemented by a hard-wired logic circuit (for example, a field-programmable gate array (FPGA) or an application specific integrated circuit (ASIC)).

Processing apparatus 200 does not have to perform all necessary processing but a plurality of processing apparatuses may perform processing as being distributed, or some processing may be performed by spectroscopic detector 20. Furthermore, a computing resource (what is called a cloud) on a not-shown network may perform the entirety or some of necessary processing.

D. Measurement Processing Including Correction Processing: Correction of Measurement Value Exemplary measurement processing including correction processing in the optical measurement system according to the present embodiment will now be described. In exemplary correction processing which will be described below, a film thickness (a measurement value) itself of sample 50 is corrected.

d1: Functional Configuration

An exemplary functional configuration for performing measurement processing including correction processing in the optical measurement system according to the present embodiment will be described with reference to FIG. 10. Each module shown in FIG. 10 may typically be implemented by execution of measurement program 214 by processor 202 of processing apparatus 200. Hardware appropriate for each age is selected as hardware that implements the functional configuration shown in FIG. 10.

Processing apparatus 200 includes a pre-processing module 260, a film thickness calculation module 264, and a correction module 266 as a functional configuration involved with measurement processing.

Pre-processing module 260 includes a wavelength calibration table 262, and associates a wavelength with a detection result from spectroscopic detector 20 and provides the result as a spectrum (intensity for each wavelength).

Film thickness calculation module 264 calculates a film thickness based on the detection result provided from spectroscopic detector 20. More specifically, film thickness calculation module 264 calculates a film thickness of sample 50 based on the spectrum provided from pre-processing module 260. A method of using a power spectrum calculated by Fourier transform of a spectrum or a method of using fitting to a prepared model may be adopted as the method of calculating a film thickness of sample 50.

Correction module 266 performs correction processing for lessening influence by variation in temperature onto the film thickness provided from film thickness calculation module 264. More specifically, correction module 266 includes a correction coefficient calculation module 268 and a divider 270.

Correction coefficient calculation module 268 calculates a correction coefficient K based on a film thickness ds0 (a reference sample film thickness 256) obtained by measurement of reference sample 60 at reference time t0 and a film thickness ds1 (a reference sample film thickness 257) obtained by measurement of reference sample 60 at any measurement time t1 temporally proximate to measurement time t1' at which the film thickness of sample 50 is measured.

For example, a ratio of film thickness ds1 (reference sample film thickness 257) of reference sample 60 obtained at any measurement time t1 to film thickness ds0 (reference sample film thickness 256) of reference sample 60 obtained at reference time t0 can be calculated as correction coefficient K. A rate of change from reference sample film thickness 256 (film thickness ds0) to reference sample film thickness 257 (film thickness ds1) can be used as correction coefficient K. In other words, the correction coefficient can be calculated as K=ds1/ds0.

As described above, depending on which of relative change and absolute change of the measurement value should be corrected, reference time t0 at which film thickness ds0 is to be obtained is set to any time such as time before start of measurement or any time while the environment similar to the environment where spectroscopic detector 20 was subjected to wavelength calibration is maintained and spectroscopic detector 20 is stable.

Divider 270 calculates a corrected film thickness by dividing the film thickness provided from film thickness calculation module 264 by correction coefficient K. In other words, a film thickness d1 of sample 50 obtained at measurement time t1' is corrected with a film thickness (corrected) d1a=d1/K=d1/(ds1/ds0)=d1×(ds0/ds1).

Correction module 266 thus corrects the measurement value of sample 50 based on change of the measurement value of reference sample 60. In other words, correction module 266 calculates the measurement value of sample 50 (film thickness (corrected) d1a) by reflecting the rate of change (correction coefficient K) from film thickness ds0 (first film thickness) calculated from detection result 251 of reference sample 60 obtained at reference time t0 to film thickness ds1 (second film thickness) calculated from detection result 252 of reference sample 60 obtained at measurement time t1, on film thickness d1 (third film thickness) calculated from detection result 253 of sample 50 obtained at measurement time t1'.

Correction module 266 provides a switching instruction for obtaining reference sample film thickness 257 (film thickness ds1) as the correction processing described above is performed. As described above, light from light source 10 is guided to reference sample 60 in accordance with the switching instruction.

d2: Experimental Example

An experimental example of the correction processing in the optical measurement system according to the present embodiment will be described.

FIGS. 11A, 11B, 12A, and 12B are time charts showing experimental examples of the correction processing in the optical measurement system according to the present embodiment. These time charts show exemplary results when the ambient temperature of the optical measurement system is varied by 5° C.

Figure 11A:
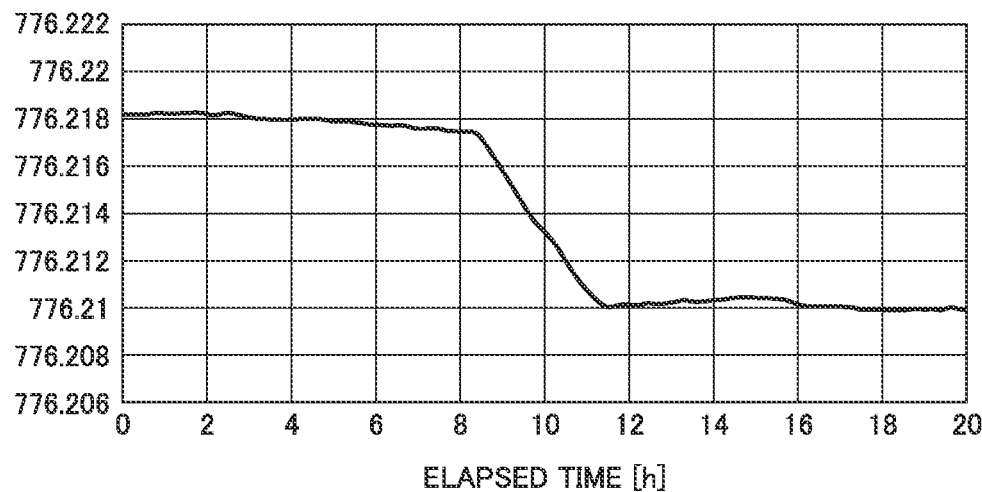
FIGS. 11A and 11B and 12A and 12B are time charts each showing an experimental example in correction processing in the optical measurement system according to the present embodiment.
Figure 11B:
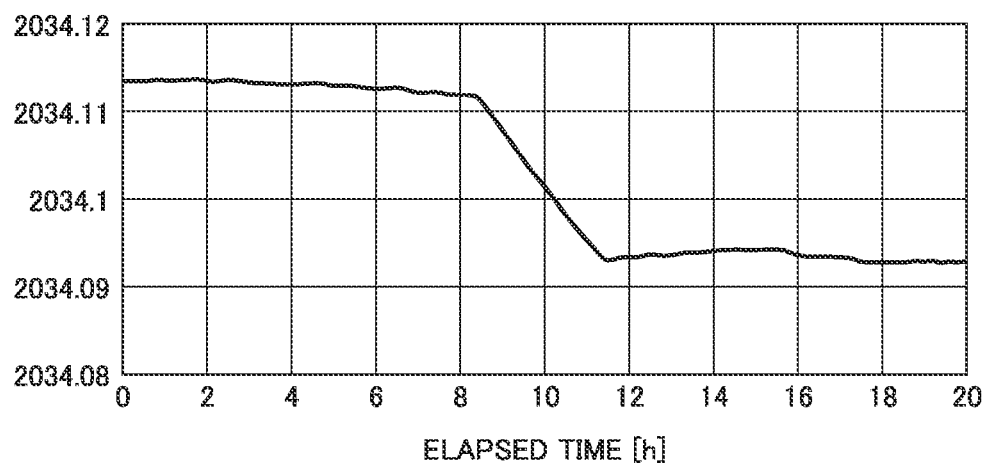

FIG. 11A shows change over time in measurement value (sample film thickness) obtained by repeated measurement of identical sample 50 by the optical measurement system. FIG. 11B shows change over time in measurement value (reference sample film thickness) obtained by repeated measurement of identical reference sample 60 by the optical measurement system.

As shown in FIGS. 11A and 11B, it can be seen that the ambient temperature greatly varies in a section of an elapsed time from 8 to 11 [h], and accordingly, even the measurement values of identical sample 50 and identical reference sample 60 vary. More specifically, in the example in FIG. 11A, variation exceeding 0.08 [μm] occurs.

Figure 12A:
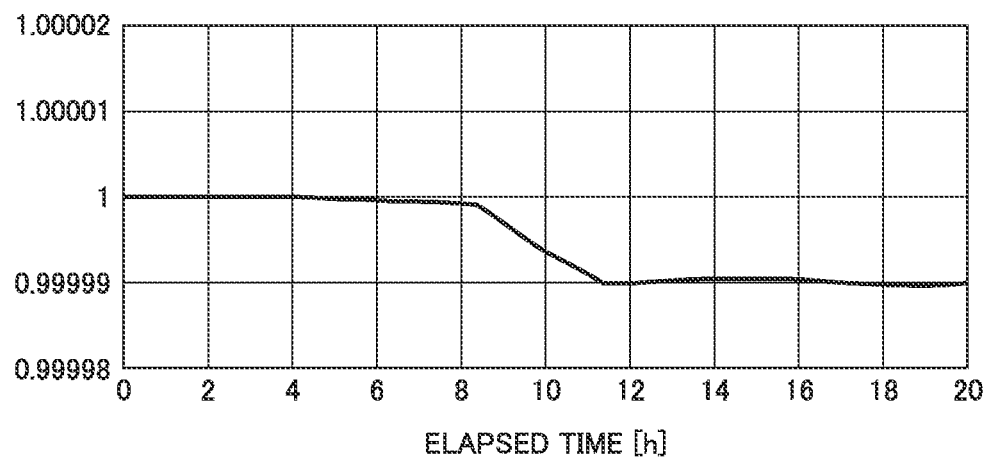

FIG. 12A shows, with the measurement value (corresponding to film thickness ds0 in FIG. 10) of reference sample 60 obtained in the initial state (the elapsed time being 0 [hr]) being defined as the reference, a ratio (a rate of change in reference sample film thickness: corresponding to correction coefficient K) thereto, of the measurement value (corresponding to film thickness ds1 in FIG. 10) of reference sample 60 obtained thereafter.

Figure 12B:
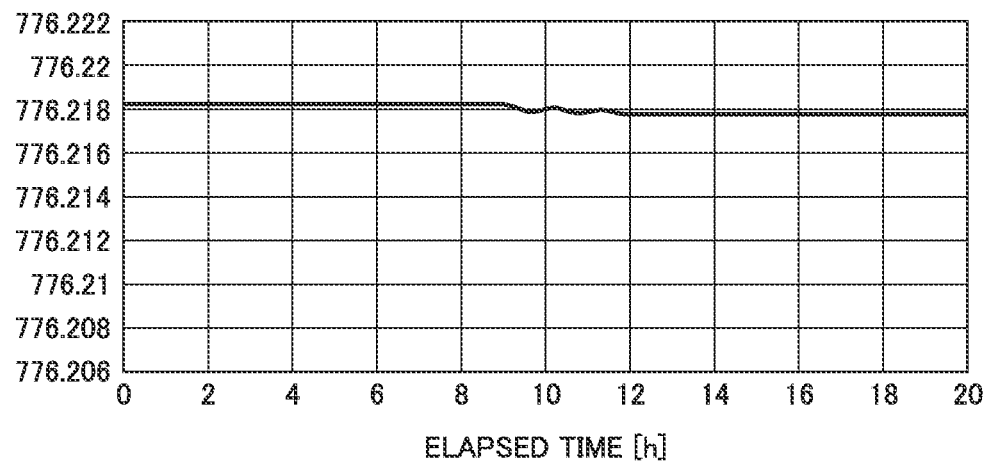

FIG. 12B shows a result of division of the measurement value (sample film thickness) of sample 50 shown in FIG. 11A by a value at corresponding time of the rate of change of reference sample film thickness shown in FIG. 12A.

As shown in FIG. 11A, it can be seen that, though there is an error in the measurement value of sample 50 due to variation in ambient temperature, the produced error can be reduced by applying the correction processing according to the present embodiment.

d3: Processing Procedure

Figure 13:
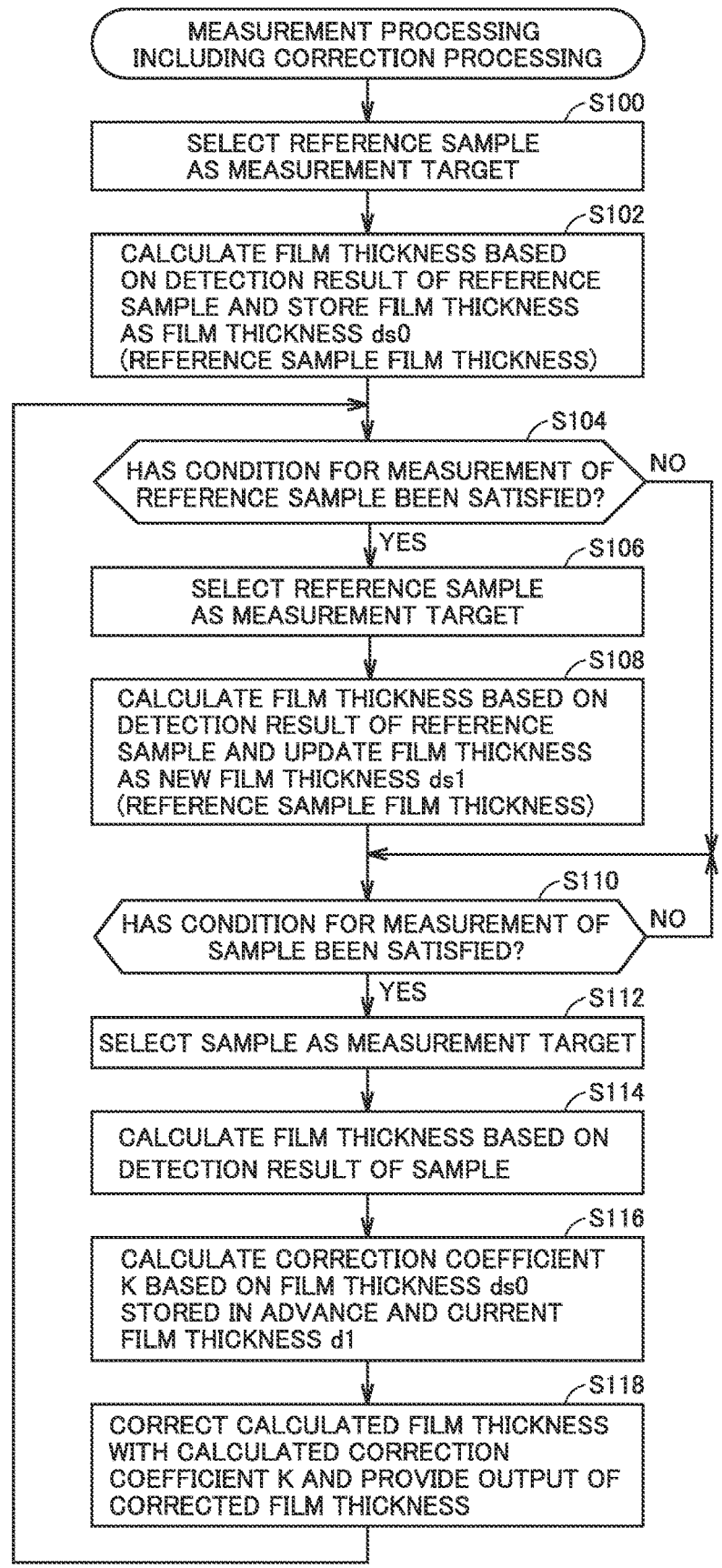
FIG. 13 is a flowchart showing a processing procedure involved with measurement processing including correction processing in the optical measurement system according to the present embodiment.

FIG. 13 is a flowchart showing a processing procedure involved with measurement processing including correction processing in the optical measurement system according to the present embodiment. Each step shown in FIG. 13 may typically be performed by execution of measurement program 214 by processor 202 of processing apparatus 200.

Referring to FIG. 13, initially, processing apparatus 200 provides a switching instruction and selects reference sample 60 as a measurement target (step S100), and calculates a film thickness based on a detection result of reference sample 60 provided from spectroscopic detector 20 and has the film thickness stored as film thickness ds0 (reference sample film thickness 256) (step S102). Processing apparatus 200 thus performs processing for obtaining the detection result provided from spectroscopic detector 20 as a result of irradiation of reference sample 60 with light from light source 10. Film thickness ds0 of reference sample 60 may be set as an initial value of film thickness ds1.

In succession, processing apparatus 200 determines whether or not a condition for measurement of reference sample 60 has been satisfied (step S104). The condition for measurement of reference sample 60 is a condition for determining whether or not film thickness ds1 of reference sample 60 should be measured, and such a condition as a prescribed number of times of measurement conducted since previous measurement of film thickness ds1 or lapse of a prescribed period since previous measurement of film thickness ds1 can be adopted.

When the condition for measurement of reference sample 60 has been satisfied (YES in step S104), processing apparatus 200 provides the switching instruction and selects reference sample 60 as the measurement target (step S106), and calculates the film thickness based on the detection result of reference sample 60 provided from spectroscopic detector 20 and updates the film thickness as new film thickness ds1 (reference sample film thickness 257) (step S108). Processing apparatus 200 thus performs processing for obtaining the detection result provided from spectroscopic detector 20 as a result of irradiation of reference sample 60 with light from light source 10.

When the condition for measurement of reference sample 60 has not been satisfied (NO in step S104), processing in steps S106 and S108 is skipped.

In succession, processing apparatus 200 determines whether or not a condition for measurement of sample 50 has been satisfied (step S110). For example, such a condition as reception of a trigger from a not-shown mechanism for conveying sample 50 can be adopted as the condition for measurement of sample 50. When the condition for measurement of sample 50 has not been satisfied (NO in step S110), processing in step S110 is repeated.

When the condition for measurement of sample 50 has been satisfied (YES in step S110), processing apparatus 200 provides the switching instruction and selects sample 50 as the measurement target (step S112), and calculates the film thickness based on the detection result of sample 50 provided from spectroscopic detector 20 (step S114). Processing apparatus 200 thus performs processing for obtaining the detection result provided from spectroscopic detector 20 as a result of irradiation of sample 50 with light from light source 10 at time temporally proximate to the time of measurement of reference sample 60.

Then, processing apparatus 200 calculates correction coefficient K based on film thickness ds0 stored in advance and current film thickness d1 (step S116), and corrects the calculated film thickness with calculated correction coefficient K and provides the corrected film thickness (step S118). Thus, processing apparatus 200 calculates the measurement value of sample 50 based on the detection result obtained in step S114 by performing correction processing based on change between the detection result obtained in step S102 and the detection result obtained in step S108. Processing in step S104 or later will thereafter be repeated.

Through the processing procedure as above, the measurement value of the film thickness or the like of sample 50 is successively calculated. Processing in steps S100 and S102 may be performed in a stage of shipment of the optical measurement system from a factory.

E. Measurement Processing Including Correction Processing: Correction of Wavelength Calibration Information Another exemplary measurement processing including correction processing in the optical measurement system according to the present embodiment will now be described. In exemplary correction processing described below, wavelength calibration information for calculating a spectrum of sample 50 is corrected.

e1: Functional Configuration

Figure 14:
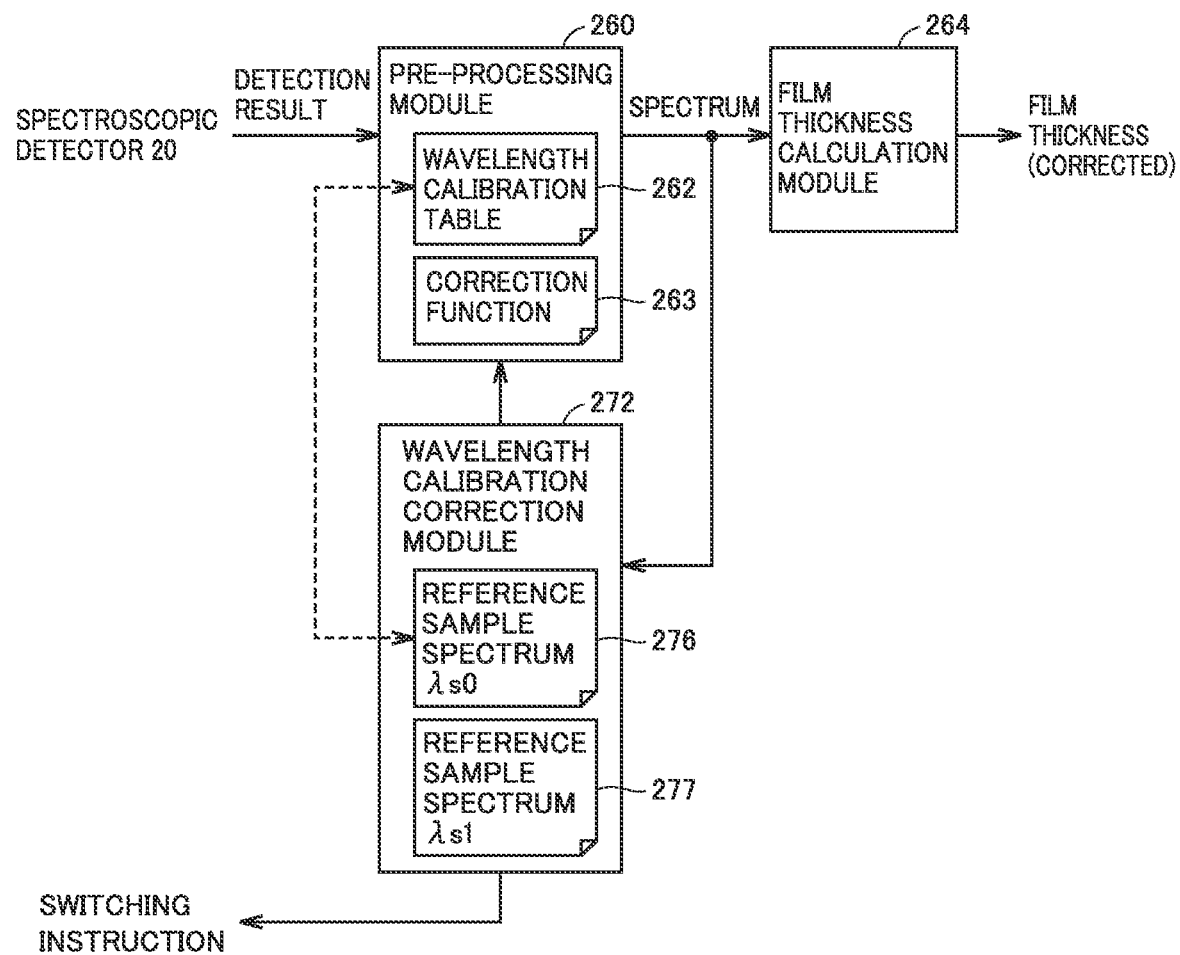
FIG. 14 is a schematic diagram showing an exemplary functional configuration for performing measurement processing including another correction processing in the optical measurement system according to the present embodiment.

An exemplary functional configuration for performing measurement processing including another correction processing in the optical measurement system according to the present embodiment will be described with reference to FIG. 14. Each module shown in FIG. 14 may typically be implemented by execution of measurement program 214 by processor 202 of processing apparatus 200. Hardware appropriate for each age is selected as hardware that implements the functional configuration shown in FIG. 14.

Processing apparatus 200 includes pre-processing module 260, film thickness calculation module 264, and a wavelength calibration correction module 272 as a functional configuration involved with measurement processing.

Pre-processing module 260 includes wavelength calibration table 262 and a correction function 263. Correction function 263 is a function for correcting characteristics of prepared wavelength calibration table 262. In the description below, wavelength calibration table 262 and correction function 263 are also collectively referred to as "wavelength calibration information." By thus referring to the wavelength calibration information and associating a wavelength with the detection result provided from spectroscopic detector 20, pre-processing module 260 provides a spectrum.

Figure 10:
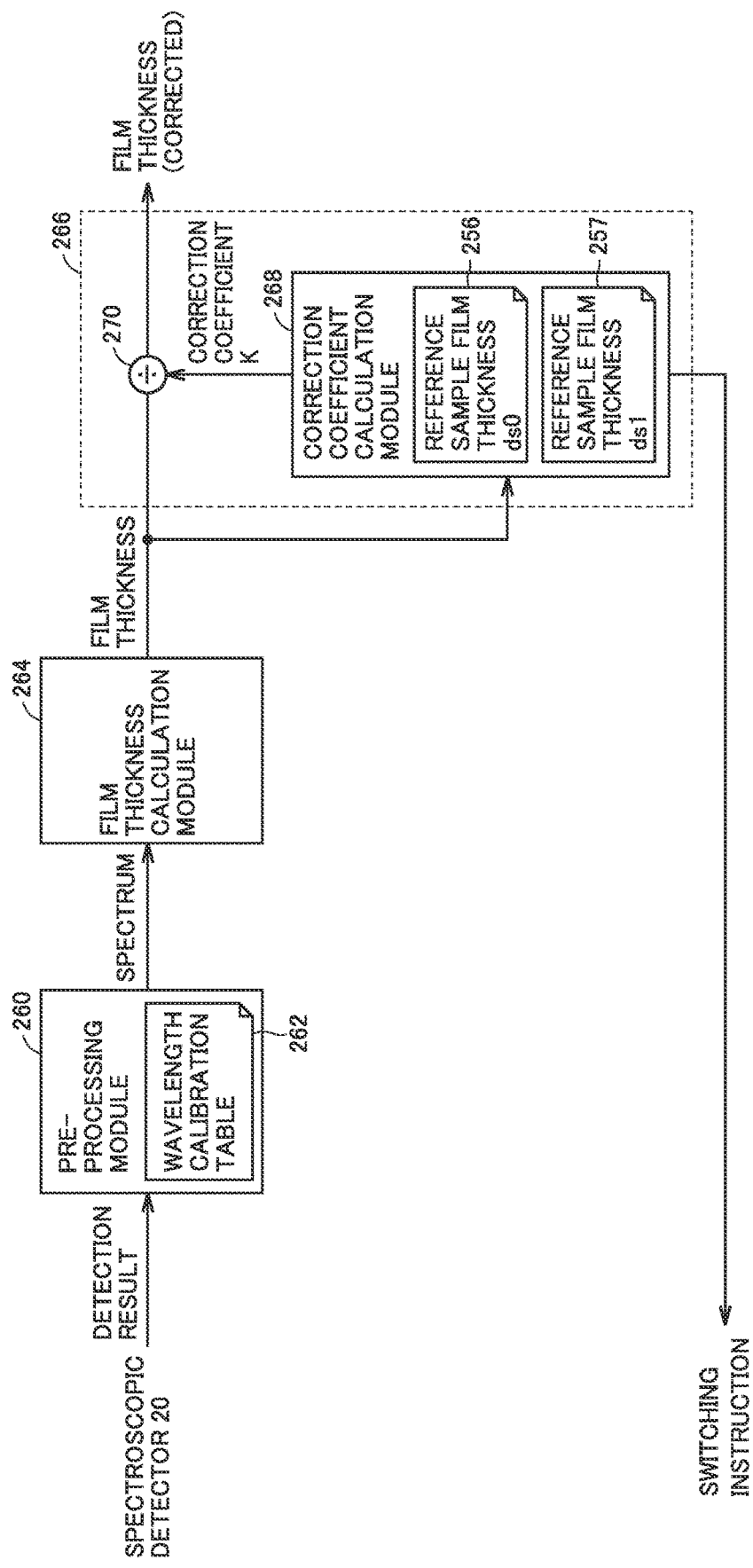
FIG. 10 is a schematic diagram showing an exemplary functional configuration for performing measurement processing including correction processing in the optical measurement system according to the present embodiment.

Film thickness calculation module 264 is similar to film thickness calculation module 264 shown in FIG. 10.

Wavelength calibration correction module 272 corrects the wavelength calibration information referred to by pre-processing module 260 to lessen influence by variation in temperature. More specifically, wavelength calibration correction module 272 calculates or updates correction function 263 based on a reference interference waveform $\lambda s0$ (a reference sample spectrum 276) obtained by measurement of reference sample 60 at reference time t0 and a reference interference waveform $\lambda s1$ (a reference sample spectrum 277) obtained by measurement of reference sample 60 at any measurement time t1 temporally proximate to time of measurement of the film thickness to be corrected. For the sake of description, a spectrum provided from pre-processing module 260 is also referred to as an interference waveform or a reference interference waveform below.

In order to correct the wavelength calibration information, reference interference waveform λs0 (reference sample spectrum 276) at the time of determination of wavelength calibration table 262 should be obtained in advance. Therefore, reference time t0 is preferably set to a time point of wavelength calibration of spectroscopic detector 20. In this case, measurement of reference sample 60 together with wavelength calibration for spectroscopic detector 20 should be conducted.

Alternatively, reference time t0 may be set to any time point after wavelength calibration of spectroscopic detector 20 while the environment similar to the environment for wavelength calibration is maintained and spectroscopic detector 20 is stable. Reference interference waveform λs0 (reference sample spectrum 276) obtained by measurement of reference sample 60 in such an environment can be regarded as being substantially identical to the reference interference waveform obtained at the time of wavelength calibration.

Wavelength calibration correction module 272 thus corrects the wavelength calibration information (correction function 263 and/or wavelength calibration table 262) based on a difference between reference interference waveform λs0 (reference sample spectrum 276) obtained by associating the wavelength with detection result 251 (first detection result) provided from spectroscopic detector 20 as a result of irradiation of reference sample 60 with light from light source 10 at reference time t0 (first time) and reference interference waveform λs1 (reference sample spectrum 277) obtained by associating the wavelength with detection result 252 (second detection result) provided from spectroscopic detector 20 as a result of irradiation of reference sample 60 with light from light source 10 at measurement time t1 (second time).

Wavelength calibration correction module 272 provides the switching instruction for obtaining reference interference waveform λs1 (reference sample spectrum 277) as the correction processing described above is performed. As described above, light from light source 10 is guided to reference sample 60 in accordance with the switching instruction.

Wavelength calibration correction module 272 thus corrects the measurement value of sample 50 based on change in detection result of reference sample 60.

Processing for correction of the wavelength calibration information by wavelength calibration correction module 272 will be described in further detail below.

FIGS. 15A, 15B, 16A, 16B, 17A, 17B, 18A, and 18B are diagrams showing exemplary interference waveforms used in correction processing in the optical measurement system according to the present embodiment. FIGS. 15A, 15B, 16A, 16B, 17A, 17B, 18A, and 18B show results of measurement of identical sample 50 and identical reference sample 60.

Figure 15A:
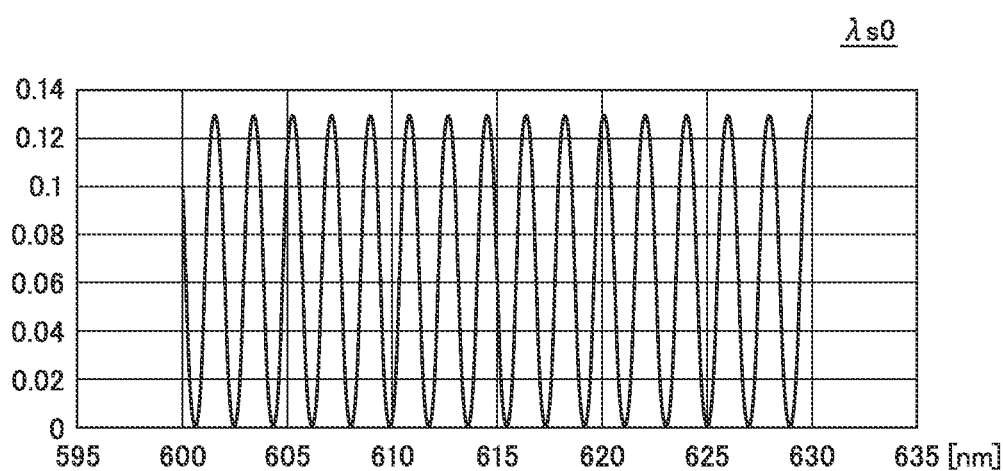
Figure 15B:
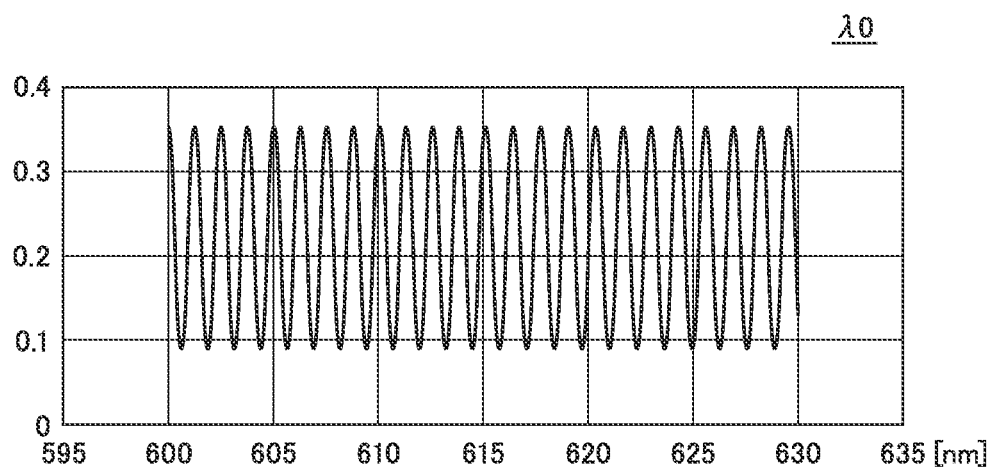

FIG. 15A shows exemplary reference interference waveform λs0 (reference sample spectrum 276) obtained by measurement of reference sample 60 at reference time t0. FIG. 15B shows exemplary interference waveform λ0 obtained by measurement of sample 50 at measurement time t0' temporally proximate to reference time t0.

Figure 16A:
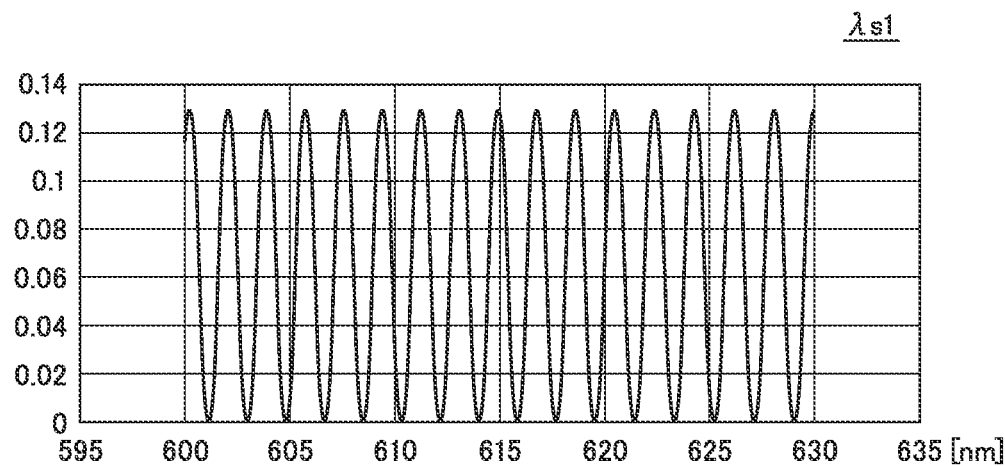
Figure 16B:
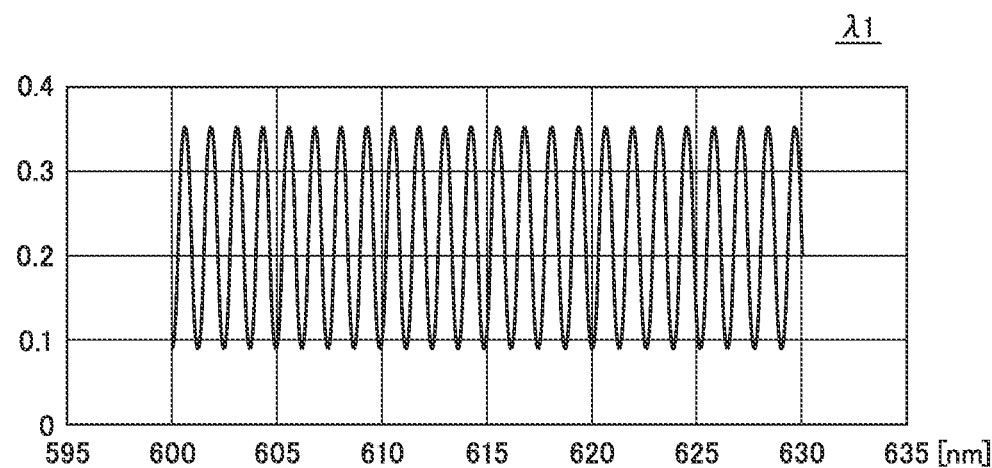

FIG. 16A shows exemplary reference interference waveform λs1 (reference sample spectrum 277) obtained by measurement of reference sample 60 at any measurement time t1. FIG. 16B shows exemplary interference waveform λ1 obtained by measurement of sample 50 at measurement time t1' temporally proximate to measurement time t1.

Figure 17A:
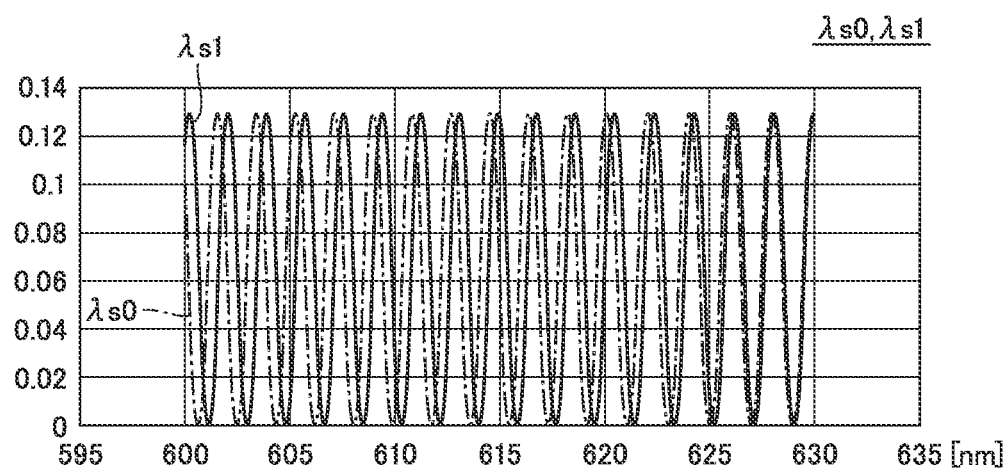
Figure 17B:
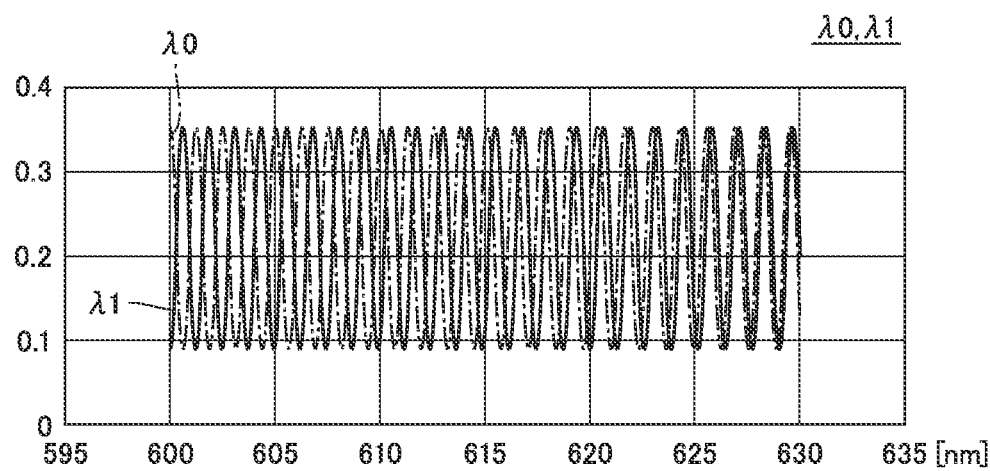

FIG. 17A shows a waveform obtained by superimposing reference interference waveform λs0 shown in FIG. 15A and reference interference waveform λs1 shown in FIG. 16A on each other, and FIG. 17B shows a waveform obtained by superimposing interference waveform λ0 shown in FIG. 15B and interference waveform λ1 shown in FIG. 16B on each other.

As shown in FIG. 17A, with variation in ambient temperature of spectroscopic detector 20, positional relation between diffraction grating 22 and light reception element 24 and diffraction grating 22 itself are varied, and correspondence between the result of detection by spectroscopic detector 20 and the wavelength may deteriorate.

By way of example, the film thickness of sample 50 calculated from interference waveform λ0 shown in FIG. 15B is 100.000955 [μm], whereas the film thickness of sample 50 calculated from interference waveform λ1 shown in FIG. 16B is 101.276985 [μm]. In other words, due to deviation between the interference waveforms, an error of approximately 1.27 [μm] is produced.

Wavelength calibration correction module 272 corrects the wavelength calibration information (substantially, correction function 263) such that reference interference waveform λs0 obtained at reference time t0 matches with reference interference waveform λs1 obtained at measurement time t1.

In a method of correcting the wavelength calibration information, for example, positions of a plurality of peak wavelengths that appear in reference interference waveform λs0 and positions of a plurality of peak wavelengths that appear in reference interference waveform λs1 are extracted, and a coefficient in an approximate polynomial is determined such that extracted positions of the wavelengths match with each other. The determined approximate polynomial is determined as correction function 263 for correcting wavelength calibration table 262.

In a calculation method for matching the positions of the wavelengths, the center of gravity of the positions of the plurality of peak wavelengths may be calculated. A prescribed number (for example, three) of proximate peaks may be extracted, a prescribed number of discrete peaks may be extracted, or all peaks may be extracted. Furthermore, any correction function can be adopted, rather than the approximate polynomial.

Figure 18A:
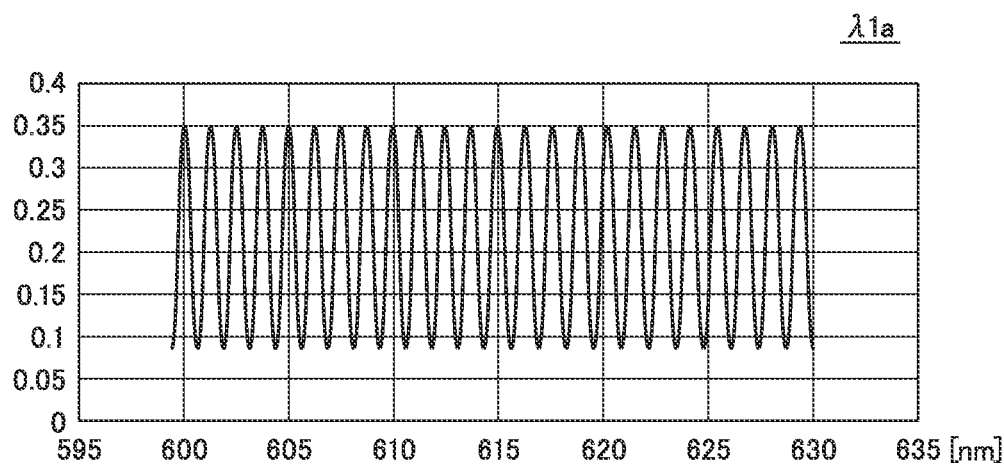

FIG. 18A shows an interference waveform λ1a (a result of correction of interference waveform λ1) of sample 50 provided based on wavelength calibration table 262 calculated from reference interference waveform λs0 and reference interference waveform λs1 shown in FIG. 18A. The film thickness of sample 50 calculated from interference waveform λ1a shown in FIG. 18A is 100.034616 [μm], and it can be seen that the error has significantly been reduced.

Figure 18B:
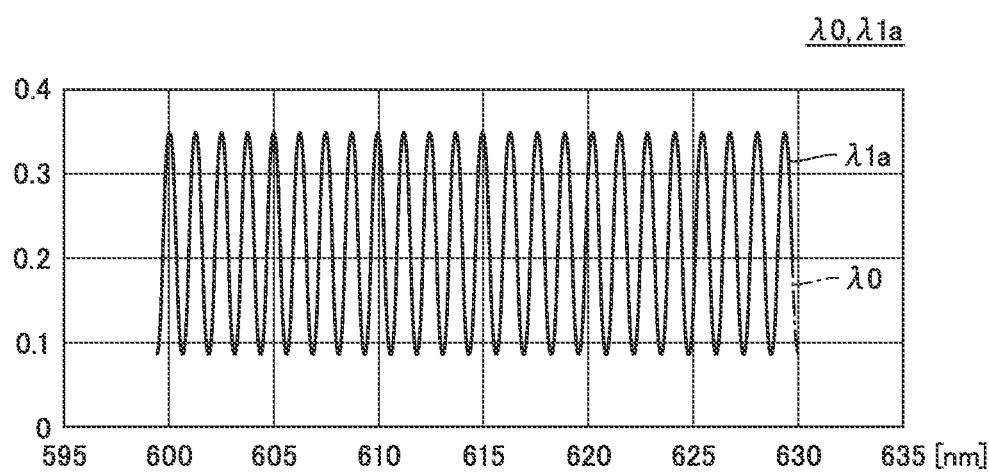

FIG. 18B shows a waveform obtained by superimposing interference waveform λ1a obtained at measurement time t1 shown in FIG. 18A and interference waveform λ0 obtained at measurement time t0' shown in FIG. 15B on each other. Since the result is obtained from measurement of identical sample 50, an identical result is ideally shown regardless of time of measurement. As shown in FIG. 18B, interference waveform λ1 a and interference waveform λ0 are seen to exhibit a substantially identical waveform.

As described above, it can be seen that, though correspondence between the result of detection by spectroscopic detector 20 and the wavelength may deteriorate due to variation in ambient temperature, a produced error can be reduced by applying the correction processing according to the present embodiment.

Though exemplary processing for correcting correction function 263 rather than wavelength calibration table 262 itself is presented in the description above, wavelength calibration table 262 itself may be updated by reflecting correction function 263 thereon.

e2: Processing Procedure

FIG. 19 is a flowchart showing a processing procedure involved with measurement processing including another correction processing in the optical measurement system according to the present embodiment. Each step shown in FIG. 19 may typically be performed by execution of measurement program 214 by processor 202 of processing apparatus 200.

Referring to FIG. 19, initially, processing apparatus 200 provides a switching instruction and selects reference sample 60 as a measurement target (step S200), and has a spectrum calculated from the detection result of reference sample 60 provided from spectroscopic detector 20 stored as reference interference waveform $\lambda s0$ (reference sample spectrum 276) (step S202). Processing apparatus 200 thus performs processing for obtaining the detection result provided from spectroscopic detector 20 as a result of irradiation of reference sample 60 with light from light source 10.

Wavelength calibration table 262 is prepared in advance by calibration processing in advance. Reference interference waveform $\lambda s0$ of reference sample 60 may be set as the initial value of reference interference waveform $\lambda s1$ (reference sample spectrum 277).

In succession, processing apparatus 200 determines whether or not a condition for measurement of reference sample 60 has been satisfied (step S204). The condition for measurement of reference sample 60 is a condition for determining whether or not correction function 263 should be updated, and such a condition as a prescribed number of times of measurement conducted since previous calculation of correction function 263 or lapse of a prescribed period since previous calculation of correction function 263 can be adopted.

When the condition for measurement of reference sample 60 has been satisfied (YES in step S204), processing apparatus 200 provides the switching instruction and selects reference sample 60 as the measurement target (step S206), and has the spectrum calculated from the detection result of reference sample 60 provided from spectroscopic detector 20 stored as reference interference waveform $\lambda s1$ (reference sample spectrum 277) (step S208). Processing apparatus 200 thus performs processing for obtaining the detection result provided from spectroscopic detector 20 as a result of irradiation of reference sample 60 with light from light source 10. Then, processing apparatus 200 updates correction function 263 based on reference interference waveform $\lambda s0$ (reference sample spectrum 276) and reference interference waveform $\lambda s1$ (reference sample spectrum 277) (step S210).

When the condition for measurement of reference sample 60 has not been satisfied (NO in step S204), processing in steps S206 to S210 is skipped.

In succession, processing apparatus 200 determines whether or not a condition for measurement of sample 50 has been satisfied (step S212). For example, such a condition as reception of a trigger from a not-shown mechanism for conveying sample 50 can be adopted as the condition for measurement of sample 50. When the condition for measurement of sample 50 has not been satisfied (NO in step S212), processing in step S212 is repeated.

When the condition for measurement of sample 50 has been satisfied (YES in step S212), processing apparatus 200 provides the switching instruction and selects sample 50 as the measurement target (step S214), and calculates the film thickness based on the detection result of sample 50 provided from spectroscopic detector 20 and provides the calculated film thickness (step S216). At this time, wavelength calibration table 262 is corrected with correction function 263, and then interference waveform $\lambda 1$ is calculated. Processing apparatus 200 thus performs processing for obtaining the detection result provided from spectroscopic detector 20 as a result of irradiation of sample 50 with light from light source 10 at time temporally proximate to time of measurement of reference sample 60. Then, processing in step S204 or later is repeated.

Through the processing procedure as above, the measurement value of the film thickness or the like of sample 50 is successively calculated. As described above, processing apparatus 200 calculates the measurement value of sample 50 from the detection result obtained in step S216 by performing correction processing based on change between the detection result obtained in step S202 and the detection result obtained in step S208.

Processing in steps S200 and S202 may be performed in a stage of shipment of the optical measurement system from a factory.

F. Summary

An optical measurement apparatus according to the present embodiment estimates and corrects influence by variation in temperature onto the measurement system including spectroscopic detector 20 based on change caused in the result of detection of reference sample 60 configured to maintain characteristics against variation in temperature. Thus, even when measurement is conducted for a relatively long period of time or when the optical measurement apparatus is arranged in an environment where the ambient temperature relatively significantly varies, influence on measurement by variation in temperature can be suppressed and an error can be reduced.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. An optical measurement system comprising:
    a light source;
    a spectroscopic detector;
    a reference sample configured to maintain characteristics against variation in temperature;
    a switching mechanism, including an optical switch or an optical shutter, that switches between a first optical path through which a sample to be measured is irradiated with light from the light source and light produced at the sample is guided to the spectroscopic detector and a second optical path through which the reference sample is irradiated with light from the light source and light produced at the reference sample is guided to the spectroscopic detector; and a processor and/or hard-wired logic circuit that calculates, by performing correction processing based on change between a first detection result provided from the spectroscopic detector as a result of irradiation of the reference sample with light from the light source at first time and a second detection result provided from the spectroscopic detector as a result of irradiation of the reference sample with light from the light source at second time, a measurement value of the sample from a third detection result provided from the spectroscopic detector as a result of irradiation of the sample with light from the light source at third time temporally proximate to the second time, wherein a length of time between the first detection result and the second detection result is substantially larger than a length of time between the second detection result and the third detection result.

2. The optical measurement system according to claim 1, wherein
the correction processing is based on change of the second detection result with the first detection result being defined as a reference.

3. The optical measurement system according to claim 1, wherein
the processor and/or hard-wired logic circuit is configured to
calculate a film thickness based on a detection result provided from the spectroscopic detector, and
calculate the measurement value of the sample by reflecting a rate of change from a first film thickness calculated from the first detection result to a second film thickness calculated from the second detection result on a third film thickness calculated from the third detection result.

4. The optical measurement system according to claim 1, wherein
the processor and/or hard-wired logic circuit is configured to
associate a wavelength with a detection result provided from the spectroscopic detector by referring to wavelength calibration information, and
correct the wavelength calibration information based on a difference between a result of association of the wavelength with the first detection result and a result of association of the wavelength with the second detection result.

5. The optical measurement system according to claim 1, wherein
a heat-insulating structure is provided around the reference sample.

6. The optical measurement system according to claim 1, wherein
the reference sample is composed of a material with which temperature dependency is substantially ignorable.

7. The optical measurement system according to claim 1, wherein
the switching mechanism includes the optical switch provided on an optical path between the light source, and the sample and the reference sample.

8. The optical measurement system according to claim 1, wherein
the switching mechanism includes the optical shutter that selectively cuts off any one of an optical path from the light source to the sample and an optical path from the light source to the reference sample.

9. An optical measurement method comprising:
measuring irradiation of a reference sample to obtain a first detection result provided from a spectroscopic detector as a result of irradiation of the reference sample with light from a light source at first time, the reference sample being configured to maintain characteristics against variation in temperature;
measuring irradiation of the reference sample to obtain a second detection result provided from the spectroscopic detector as a result of irradiation of the reference sample with light from the light source at second time;
measuring irradiation of a sample to obtain a third detection result provided from the spectroscopic detector as a result of irradiation of the sample with light from the light source at third time temporally proximate to the second time; and
calculating a measurement value of the sample from the third detection result by performing correction processing based on change between the first detection result and the second detection result,
wherein a length of time between the first detection result and the second detection result is substantially larger than a length of time between the second detection result and the third detection result.

10. The optical measurement method according to claim 9, wherein
the calculating the measurement value of the sample is based on change of the second detection result with the first detection result being defined as a reference.

11. The optical measurement method according to claim 9, wherein
the calculating the measurement value of the sample comprises reflecting a rate of change from a first film thickness calculated from the first detection result to a second film thickness calculated from the second detection result on a third film thickness calculated from the third detection result.

12. The optical measurement method according to claim 9, wherein
the calculating the measurement value of the sample comprises
associating a wavelength with a detection result provided from the spectroscopic detector by referring to wavelength calibration information, and
correcting the wavelength calibration information based on a difference between a result of association of the wavelength with the first detection result and a result of association of the wavelength with the second detection result.

13. The optical measurement method according to claim 9, wherein
the reference sample is composed of a material with which temperature dependency is substantially ignorable.

14. The optical measurement method according to claim 9, further comprising
switching an optical path between the light source, and the sample and the reference sample.

15. A non-transitory storage medium having a measurement program for measurement of a sample stored thereon, the measurement program causing a computer to perform:
measuring irradiation of a reference sample to obtain a first detection result provided from a spectroscopic detector as a result of irradiation of the reference sample with light from a light source at first time, the reference sample being configured to maintain characteristics against variation in temperature;

measuring irradiation of the reference sample to obtain a second detection result provided from the spectroscopic detector as a result of irradiation of the reference sample with light from the light source at second time;

measuring irradiation of the sample to obtain a third detection result provided from the spectroscopic detector as a result of irradiation of the sample with light from the light source at third time temporally proximate to the second time; and calculating a measurement value of the sample from the third detection result by performing correction processing based on change between the first detection result and the second detection result, wherein a length of time between the first detection result and the second detection result is substantially larger than a length of time between the second detection result and the third detection result.

16. The non-transitory storage medium according to claim 15, wherein the calculating the measurement value of the sample is based on change of the second detection result with the first detection result being defined as a reference.

17. The non-transitory storage medium according to claim 15, wherein the calculating the measurement value of the sample comprises reflecting a rate of change from a first film thickness calculated from the first detection result to a second film thickness calculated from the second detection result on a third film thickness calculated from the third detection result.

18. The non-transitory storage medium according to claim 15, wherein the calculating the measurement value of the sample comprises
associating a wavelength with a detection result provided from the spectroscopic detector by referring to wavelength calibration information, and
correcting the wavelength calibration information based on a difference between a result of association of the wavelength with the first detection result and a result of association of the wavelength with the second detection result.

19. The non-transitory storage medium according to claim 15, wherein the reference sample is composed of a material with which temperature dependency is substantially ignorable.

20. The non-transitory storage medium according to claim 15, wherein the measurement program further causes the computer to perform switching an optical path between the light source, and the sample and the reference sample.

* * * * *